(12) United States Patent
Dahl et al.

(10) Patent No.: US 12,554,319 B2
(45) Date of Patent: Feb. 17, 2026

(54) SYSTEMS AND METHODS FOR HEAD POSE DATA

(71) Applicant: TOBII AB, Danderyd (SE)

(72) Inventors: Anders Dahl, Danderyd (SE); Erik Lindén, Danderyd (SE); Anna Larsen Redz, Danderyd (SE); Per Olof Jonatan Walck, Danderyd (SE); Pontus Christian Walck, Danderyd (SE)

(73) Assignee: Tobii AB

( * ) Notice: Subject to any disclaimer, the term of this patent is extended or adjusted under 35 U.S.C. 154(b) by 0 days.

(21) Appl. No.: 18/424,924

(22) Filed: Jan. 29, 2024

(65) Prior Publication Data

US 2024/0256030 A1  Aug. 1, 2024

(30) Foreign Application Priority Data

Jan. 31, 2023  (SE) .................... 2350088-7

(51) Int. Cl.
| | | |
|---|---|---|
| G06F 3/01 | (2006.01) | |
| G06T 7/70 | (2017.01) | |
| G06V 10/762 | (2022.01) | |
| G06V 20/70 | (2022.01) | |

(52) U.S. Cl.
CPC .............. G06F 3/012 (2013.01); G06T 7/70 (2017.01); G06V 10/762 (2022.01); G06V 20/70 (2022.01); *G06T 2207/30196* (2013.01); *G06T 2207/30204* (2013.01)

(58) Field of Classification Search
CPC ........ G06F 3/012; G06F 3/013; G06F 3/0308; G06F 18/214; G06T 7/70; G06T 7/246; G06T 7/73; G06T 7/85; G06T 7/74; G06T 2207/30196; G06T 2207/30204; G06T 2207/30244; G06T 2207/30208; G06V 10/762; G06V 10/12; G06V 10/141; G06V 10/774; G06V 20/70; G06V 40/10;
(Continued)

(56) References Cited

U.S. PATENT DOCUMENTS

| | | | |
|---|---|---|---|
| 9,659,411 B2 * | 5/2017 | Thomas | .................... G06T 7/73 |
| 10,706,274 B1 * | 7/2020 | Ng | ........................ H04N 19/895 |
| 12,053,247 B1 * | 8/2024 | Chiou | ...................... G06F 3/011 |

(Continued)

FOREIGN PATENT DOCUMENTS

| | | |
|---|---|---|
| DE | 102017000962 A1 | 11/2017 |
| DE | 102018002224 A1 | 8/2018 |

(Continued)

OTHER PUBLICATIONS

Swedish Search Report for Application No. 2350088-7, completed on Sep. 1, 2023.

*Primary Examiner* — Christopher E Leiby
(74) *Attorney, Agent, or Firm* — Christopher Ignatius Moylan

(57) ABSTRACT

A motion-capture head module for tracking a head pose of a user comprising: a headband for attaching to a head of the user; a post extending from the headband; and at least three markers, wherein each marker is coupled to the post by a respective one of at least three branching members extending from the post, such that the at least three markers have a first fixed geometrical relationship with respect to each other.

13 Claims, 16 Drawing Sheets

(58) Field of Classification Search
CPC .............. G06V 40/165; G02B 27/0093; G01B 21/042; G01C 11/06
See application file for complete search history.

(56) References Cited

U.S. PATENT DOCUMENTS

| | | | | |
|---|---|---|---|---|
| 2003/0038945 | A1* | 2/2003 | Mahner | G01B 11/2441 |
| | | | | 356/457 |
| 2013/0305806 | A1* | 11/2013 | Saito | G06T 7/246 |
| | | | | 73/11.01 |
| 2014/0152550 | A1* | 6/2014 | Beall | H04N 23/20 |
| | | | | 345/156 |
| 2014/0364212 | A1* | 12/2014 | Osman | A63F 13/212 |
| | | | | 463/31 |
| 2015/0261291 | A1* | 9/2015 | Mikhailov | G06T 7/73 |
| | | | | 345/156 |
| 2016/0232715 | A1* | 8/2016 | Lee | G06F 3/011 |
| 2017/0230644 | A1 | 8/2017 | Takizawa | |
| 2017/0319143 | A1* | 11/2017 | Yu | A61B 5/682 |
| 2018/0101227 | A1* | 4/2018 | Frueh | G06T 15/40 |
| 2018/0185100 | A1 | 7/2018 | Weinstein et al. | |
| 2020/0004327 | A1* | 1/2020 | Wang | G06F 3/013 |
| 2021/0186624 | A1 | 6/2021 | Charles | |
| 2021/0346098 | A1 | 11/2021 | Calloway et al. | |
| 2022/0110701 | A1* | 4/2022 | Crawford | A61B 34/76 |
| 2023/0206640 | A1* | 6/2023 | Fujimoto | G06V 20/44 |
| | | | | 382/156 |
| 2023/0233258 | A1* | 7/2023 | Young | A61B 90/36 |
| | | | | 606/130 |

FOREIGN PATENT DOCUMENTS

| | | |
|---|---|---|
| EP | 3760150 A1 | 1/2021 |
| WO | 2016110804 A1 | 7/2016 |
| WO | 2018203304 A1 | 11/2018 |

* cited by examiner

SYSTEMS AND METHODS FOR HEAD POSE DATA

CROSS-REFERENCE TO RELATED APPLICATION

The present application claims priority to Swedish patent application No. 2350088-7, filed Jan. 31, 2023, entitled "SYSTEMS AND METHODS FOR HEAD POSE DATA", and is hereby incorporated by reference in its entirety.

FIELD

The present disclosure relates to systems and methods for collecting head pose data for annotating images for machine learning head-pose detection algorithms.

BACKGROUND

In eye tracking applications, digital images are retrieved of the eyes of a user and the digital images are analysed in order to estimate gaze direction of the user. The estimation of the gaze direction may be based on computer-based image analysis of features of the imaged eye. One known example method of eye tracking includes the use of infrared light and an image sensor. The infrared light is directed towards eye(s) of a user and the reflection of the light is captured by an image sensor.

Eye tracking systems may be provided in a head-mounted device, such as a virtual or augmented reality (VR or AR) device or VR or AR glasses or anything related, such as extended reality (XR) or mixed reality (MR) headsets. In such systems a pose (position and orientation) of a user's head are substantially fixed in relation to image sensors or cameras of the eye-tracking systems.

Eye tracking systems may also be provided as remote eye-tracking systems in which the image sensors are not always fixed relative to the pose of the head. Such systems may be used in conjunction with computing devices (e.g., laptops, desktops, tablets, etc.) and may also find use in driver monitoring applications in the automotive sector.

Remote eye-tracking systems may implement one or more algorithms for detecting the pose of the user's head. The one or more algorithms may comprise a machine learning (ML) algorithm. Providing accurate training data for the one or more head pose ML algorithms can be challenging. The present disclosure provides systems and methods that can provide training images with accurate ground truths (annotation) of the user's head pose for training head pose ML algorithms for a remote eye tracking application.

SUMMARY

According to a first aspect of the present disclosure there is provided a motion-capture head module for tracking a head pose of a user comprising:
  a headband for attaching to a head of the user;
  a post extending from the headband; and
  at least three markers, wherein each marker is coupled to the post by a respective one of at least three branching members extending from the post, such that the at least three markers have a first fixed geometrical relationship with respect to each other.

By coupling the at least three markers to the headband via the post, the at least three markers advantageously maintain the fixed geometric relationship with respect to each other regardless of any deformation of the headband.

Each marker may be coupled to a distal end of the post by the respective one of the at least three branching members which may extend from the distal end of the post. The fixed geometrical relationship of the at least three markers may define a marker plane.

The headband may comprise a flexible headband.

The post may comprise a rigid post and the at least three branching members comprise rigid branching members.

The at least three markers may comprise at least three reflective markers. The at least three markers may comprise retro-reflective markers. The at least three markers may comprise motion capture spheres.

The first fixed geometrical relationship may comprise an irregular relationship.

Each marker may comprise a different size.

The headband may comprise a flexible headband. The motion-capture head module may further comprise:
  a second post extending from the headband; and
  at least three further markers, wherein each further marker is coupled to the second post by a respective one of at least three further branching members extending from the second post, such that the at least three further markers have a second fixed geometrical relationship with respect to each other.

Each further marker may be coupled to a distal end of the second post by the respective one of the at least three further branching members which may extend from the distal end of the second post. The second fixed geometrical relationship of the at least three further markers may define a further marker plane.

The first post and the second post may each extend from the head band from respective first and second locations on the headband.

The second fixed geometrical relationship may be different to the first fixed geometrical relationship.

Each marker and each further marker may comprise a different size.

The first fixed geometrical relationship and the second fixed geometrical relationship may each comprise an irregular relationship.

The headband may comprise a radiation absorbing material. The headband may comprise a near-infra red absorbing material. The headband may comprise a near-infra red absorbing paint.

According to a second aspect of the present disclosure, there is provided a method for tracking a pose of a head of a user, the method comprising:
  receiving a first image, captured by a first camera at a first time, of the user wearing a motion-capture head module, wherein the motion capture head module comprises:
    a headband;
    a first cluster of markers comprising a first marker, a second marker and a third marker having a first fixed geometrical relationship with respect to each other; and
    a second cluster of markers comprising a fourth marker, a fifth marker and a sixth marker, having a second fixed geometrical relationship with respect to each other;
  receiving a second image, captured by a second camera at the first time, of the user wearing the motion-capture head module, wherein the first camera and the second camera each have a different known pose in a world coordinate system and wherein the first to sixth markers are visible in both the first and second images;

triangulating three-dimensional (3D) coordinates of each marker in each of the first cluster and the second cluster in the world coordinate system, based on the position of each marker in each of the first image and the second image;

individually associating each triangulated 3D coordinate with a respective one of the first to sixth markers using the first and second fixed geometrical relationships;

determining a third fixed geometrical relationship between each of the first to sixth markers based on the specifically associated 3D coordinates of each marker;

receiving further first images captured by the first camera at a series of time points and receiving corresponding further second images captured by the second camera at the series of time points, wherein each further first image and each further second image capture the user wearing the motion-capture head module;

for each corresponding pair of further first and second images:

triangulating the 3D coordinates of at least three markers of the first to sixth markers in the world coordinate system based on the position of each of the at least three markers in the further first image and the further second image; and determining a pose of a head module coordinate system with respect to the world coordinate system based on the 3D coordinates of the at least three markers and the third fixed geometrical relationship.

According to a third aspect of the present disclosure there is provided a method of generating training images for a machine learning head-pose detection algorithm, the method comprising:

the method of the second aspect; and determining a head pose value for each further first image and further second image based on the respective pose of the head module coordinate system and the pose of the first camera and the second camera in the world coordinate system; and generating first and second training images by annotating the first further images and the second further images with the respective head pose value.

Determining the head pose value for each further first image and further second image based on the respective pose of the head module coordinate system and the pose of the first camera and the second camera in the world coordinate system may comprise:

transforming the respective pose of the head module coordinate system to a specific first camera coordinate system using the pose of the first camera in the world coordinate system; and transforming the respective pose of the head module coordinate system to a specific second camera coordinate system using the pose of the second camera in the world coordinate system.

Determining the head pose value for each further first image and further second image based on the respective pose of the head module coordinate system may comprise determining a pose of a head coordinate system with respect to the world coordinate system by transforming the head module coordinate system using a predetermined mapping operator.

The headband may be a flexible headband. The method may further comprise:

determining a deformation of the headband based on the individually associated 3D coordinates of one or more markers in each of the first cluster and the second cluster;

determining a 3D profile of the headband in the head module coordinate system based on the deformation of the headband;

determining a two dimensional, 2D, profile of the headband 3032 in each of the further first images and further second images based on:

a pose of the head module coordinate system with respect to the world coordinate system in the respective further first image or further second image;

and a pose of the respective first or second camera in the world coordinate system; and generating the first and second training images by painting over the 2D profile of the headband in each of the respective further first images and further second images.

The second fixed geometrical relationship may be different to the first fixed geometrical relationship.

Each marker may comprise a different size.

The first fixed geometrical relationship and the second fixed geometrical relationship may comprise an irregular relationship (with no symmetry).

The motion-capture head module may comprise any motion-capture head module disclosed herein.

According to a fourth aspect of the present disclosure there is provided a calibration device for determining a relationship between a head coordinate system of a user's head and a world coordinate system, the calibration device comprising:

vertical axis face engaging components, aligned along a first axis of the calibration device, the vertical-axis face engaging components comprising:

a first vertical axis face engaging component for engaging a first feature along a vertical axis of the user's face; and a second vertical axis face engaging component for engaging a second feature along the vertical axis of the user's face;

eye axis reference components, aligned along a second axis of the calibration device, the eye axis reference components comprising:

a first adjustable eye axis reference component comprising a first visual reference for adjusting along the second axis of the calibration device to align with a first eye of the user; and a second adjustable eye axis reference component comprising a second visual reference for adjusting along the second axis of the calibration device to align with a second eye of the user; and a calibration device fiducial reference having a predetermined geometrical relationship with respect to the first axis and the second axis of the calibration device.

The first feature and the second feature may comprise different ones of: a chin, a forehead, a sellion, a tip of a nose, a septum or a philtrum of the user.

The first and second adjustable eye reference components may be mounted on a synchronous adjustment mechanism.

The calibration device may comprise at least three markers. The calibration device fiducial reference may comprise at least three reflective markers. The at least three reflective markers may comprise retroreflective markers. The at least three reflective markers may comprise motion capture spheres.

According to a fifth aspect of the present disclosure there is provided a method for determining a relationship between a head coordinate system of a user's head and a world coordinate system, the method comprising:

receiving a first image, captured by a first camera at a first time, of the user with a calibration device aligned to their face, the calibration device comprising:
  vertical axis face engaging components, aligned along a first axis of the calibration device, the vertical axis face engaging components comprising:
    a first vertical axis face engaging component for engaging a first feature along a vertical axis of the user's face; and
    a second vertical axis face engaging component for engaging a second feature along the vertical axis of the user's face;
  eye axis reference components, aligned along a second axis of the calibration device, the eye axis reference components comprising:
    a first adjustable eye axis reference component comprising a pinhole for adjusting along the second axis of the calibration device to align with a first eye of the user; and
    a second adjustable eye axis reference component comprising a pinhole for adjusting along the second axis of the calibration device to align with a second eye of the user; and
  a calibration device fiducial reference having a predetermined geometrical relationship with respect to the first axis and the second axis of the calibration device;
receiving a second image, captured by a second camera at the first time, of the user with the calibration device aligned to their face, wherein the first camera and the second camera each have a different known pose in a world coordinate system;
triangulating a three-dimensional, 3D, pose of the calibration device fiducial reference in the world coordinate system based on a pose of the calibration device fiducial reference in both the first image and the second image;
determining the first axis and the second axis of the calibration device in the world coordinate system based on the 3D pose of the calibration device fiducial reference and the predetermined geometrical relationship; and
determining a pose of the head coordinate system in the world coordinate system based on the first axis and the second axis of the calibration device.

The calibration device fiducial reference may comprise at least three markers having a fixed relative geometrical relationship. Triangulating the 3D pose of the calibration device fiducial reference may comprise triangulating the 3D position of each marker based on the position of the marker in each of the first image and the second image. The at least three markers may comprise reflective markers.

Determining the pose of the head coordinate system may comprise:
  determining a first axis of the head coordinate system as the first axis of calibration device;
  determining a second axis of head coordinate system as the second axis of calibration device; and
  determining a third axis of the head coordinate system as an axis perpendicular to both the first axis and the second axis of the calibration device.

The method may further comprise determining an origin of the head coordinate system as a 3D position at a predetermined distance behind the calibration device, along the third axis of the head coordinate system.

The first image and the second image may include the user wearing a motion-capture head module with a head module fiducial reference. The method may further comprise:
  determining a pose of the head module coordinate system with respect to the world coordinate system based on the pose of the head module fiducial reference in the first image and the second image;
  determining a mapping operator for transforming the head module coordinate system to the head coordinate system;
  receiving, a further first image captured by the first camera at a second time and a further second image captured by the second camera at the second time, of the user wearing the motion-capture head module in the absence of the calibration device;
  determining a pose of the head module coordinate system with respect to the world coordinate system at the second time based on the pose of the head module fiducial reference in the further first image and the further second image;
  determining a pose of the head coordinate system with respect to the world coordinate system at the second time based on the pose of the head module coordinate system with respect to the world coordinate system at the second time, and the mapping operator;
  determining a head pose value of the user at the second time, for each of the further first image and the further second image, based on the pose of the head module coordinate system with respect to the world coordinate system at the second time and the pose of the respective first camera or second camera in the world coordinate system; and
annotating the first further image and the second further image with the respective head pose value.

According to a sixth aspect of the present disclosure, there is provided a method for determining an eye-axis of a user with respect to a world coordinate system, the method comprising:
  receiving a plurality of first images, captured by a first camera at a series of time points, of the user wearing a motion-capture head module comprising a head module fiducial reference and looking at one of a plurality of reference points with known positions in the world coordinate system, wherein each of the plurality of first images comprise a first annotated pupil position for a first eye of the user and a second annotated pupil position for a second eye of the user;
  receiving a plurality of second images of the user, captured by a second camera at the series of time points, wherein the first camera and the second camera each have a different known pose in the world coordinate system;
  for each pair of first and second images captured at the same time point, determining a pose of a head module coordinate system with respect to the world coordinate system, by triangulating the pose of the head module fiducial reference in the world coordinate system based on the pose of the head module fiducial reference in the first image and the second image;
  determining a first centre of rotation of the first eye and a first radius of the first eye based on:
    the first annotated pupil position;
    the pose of the head module coordinate system with respect to the world coordinate system; and
    the known position of the reference point in the world coordinate system, for each of the plurality of first images;

determining a second centre of rotation of the second eye and a second radius of the second eye based on:
   the second annotated pupil position;
   the pose of the head module coordinate system with respect to the world coordinate system; and
   the reference point in the world coordinate system, for each of the plurality of first images;
and
determining the eye axis as a vector between the first centre of rotation and the second centre of rotation.

Determining a first centre of rotation and a first radius of the first eye may comprise:
   setting an initial value of the first centre of rotation and an initial value of the first radius;
   for each first image in the plurality of first images:
      determining a first camera ray in the world coordinate system by back-projecting from a position of the first camera through the first annotated pupil position in the first image;
      transforming the first camera ray to the head module coordinate system using the pose of the head module coordinate system with respect to the world coordinate system;
      determining a position of the reference point, associated with the first image, in the head module coordinate system using the known position of the reference point in the world coordinate system and the pose of the head module coordinate system with respect to the world coordinate system;
      determining a first gaze ray extending from the first centre of rotation towards the position of the reference point in the head module coordinate system, with a length equal to the first radius; and
      determining a first minimum distance between the first camera ray and a distal end of the first gaze ray; and
   iteratively adjusting the values of the first centre of rotation and the first radius and recalculating the first gaze ray for each first image to select values of the first centre of rotation and the first radius that reduce a first error value, wherein the first error value is based on the value of the first minimum distance for each first image, and wherein, determining a second centre of rotation and a second radius of the second eye comprises:
   setting an initial value of the second centre of rotation and an initial value of the second radius;
   for each first image in the plurality of first images:
      determining a second camera ray in the world coordinate system by back-projecting from a position of the first camera through the second annotated pupil position in the first image;
      transforming the second camera ray to the head module coordinate system using the pose of the head module coordinate system with respect to the world coordinate system;
      determining a second gaze ray extending from the second centre of rotation towards the position of the reference point in the head module coordinate system, with a length equal to the second radius; and
      determining a second minimum distance between the second camera ray and a distal end of the second gaze ray; and
   iteratively adjusting the values of the second centre of rotation and the second radius and recalculating the second gaze ray for each first image to select values of the second centre of rotation and the second radius that reduce a second error value, wherein the second error value is based on the value of the second minimum distance for each first image.

Determining the first camera ray may comprise determining the first camera ray in the world coordinate system by back-projecting from the position of the first camera through the first annotated pupil position in the first image using the known pose of the first camera, a field of view of the first camera and a 2D pixel location of the first annotated pupil position in the first image.

Determining the first camera ray in the world coordinate system may comprise:
   determining the first camera ray in a first camera coordinate system by back-projecting from the position of the first camera through the first annotated pupil position in the first image; and
   determining the first camera ray in the world coordinate system by transforming the first camera ray from the first camera coordinate system to the world coordinate system based on the pose of the first camera in the world coordinate system.

Determining the second camera ray may comprise determining the second camera ray in the world coordinate system by back-projecting from the position of the first camera through the second annotated pupil position in the first image using the known pose of the first camera, a field of view of the first camera and a 2D pixel location of the second annotated pupil position in the first image.

Determining the second camera ray in the world coordinate system may comprise:
   determining the second camera ray in a first camera coordinate system by back-projecting from the position of the first camera through the second annotated pupil position in the first image; and
   determining the second camera ray in the world coordinate system by transforming the second camera ray from the first camera coordinate system to the world coordinate system based on the pose of the first camera in the world coordinate system.

Iteratively adjusting the values of the first centre of rotation and the first radius and iteratively adjusting the values of the second centre of rotation and the second radius may each comprise iteratively adjusting the values of the respective first or second centre of rotation and the respective first or second radius until a termination criterion is satisfied.

The first and second image may comprise the user wearing spectacles. The method may further comprise:
   setting initial values for a position and power of a first lens of the spectacles for the first eye;
   setting initial values for a position and power of a second lens of the spectacles for the second eye;
   determining the first camera ray and determining the second camera ray by calculating refraction of the respective first or second camera ray by the respective first or second lens;
   iteratively adjusting the values of the first centre of rotation, first radius and the position and power of the first lens to select the values of the first centre of rotation, first radius and the position and power of the first lens that reduce the first error value; and
   iteratively adjusting the values of the second centre of rotation, second radius and the position and power of the second lens to select the values of the second centre of rotation, second radius and the position and power of the second lens that reduce the second error value.

The method may further comprises determining an origin of the head coordinate system as a position equidistant between the first centre of rotation and the second centre of rotation.

Determining the origin of the head coordinate system may comprises determining the origin of the head coordinate system with respect to the head module coordinate system.

The method may further comprise:
receiving a calibrating first image, captured by the first camera at a first time, of the user wearing the motion capture head module and with a calibration device aligned to their face, the calibration device comprising:
vertical axis face engaging components, aligned along a first axis of the calibration device, the vertical-axis face engaging components comprising:
a first vertical axis face engaging component for engaging a first feature along a vertical axis of the user's face; and
a second vertical axis face engaging component for engaging a second feature along the vertical axis of the user's face; and
a calibration device fiducial reference having a predetermined geometrical relationship with respect to the first axis of the calibration device.
receiving a calibrating second image, captured by the second camera at the calibration time;
determining a 3D pose of the calibration device fiducial reference with respect to the world coordinate system based on a pose of the calibration device fiducial reference in both the first calibrating image and the second calibrating image;
determining the first axis of the calibration device in the world coordinate system based on the 3D pose of the calibration device fiducial reference with respect to the world coordinate system;
determining a pose of the head module coordinate system with respect to the world coordinate system for the first and second calibrating images, by triangulating the pose of the head module fiducial reference in the world coordinate system based on the pose of the head module fiducial reference in the first calibrating image and the second calibrating image; and
determining a pose of the head coordinate system based on the first axis of the calibration device, the eye-axis and the pose of the head module coordinate system with respect to the world coordinate system for the first and second calibrating images.

Determining the eye axis may comprise determining the eye axis with respect to the head module coordinate system.

Determining the pose of the head coordinate system may comprise:
determining an origin of the head coordinate system with respect to the head module coordinate system as a position equidistant between the first centre of rotation and the second centre of rotation;
determining a vertical axis of the head coordinate system as the first axis of the calibration device with respect to the head module coordinate system by transforming the first axis of the calibration device in the world coordinate system using the pose of the head module coordinate system with respect to the world coordinate system for the first and second calibrating images;
determining a third axis of the head coordinate system as an axis extending from the origin of the head coordinate system and perpendicular to both the vertical axis of the head coordinate system and the eye axis of the head coordinate system, with respect to the head module coordinate system; and
determining a mapping operator for transforming the head module coordinate system to the head coordinate system based on the vertical axis, the eye axis, the third axis and the origin of the head coordinate system, with respect to the head module coordinate system.

The method may further comprise:
receiving, a further first image captured by the first camera at a second time and a further second image captured by the second camera at the second time, of the user wearing the motion-capture head module in the absence of the calibration device;
determining a pose of the head module coordinate system with respect to the world coordinate system at the second time based on the pose of the head module fiducial reference in the further first image and the further second image;
determining a pose of the head coordinate system with respect to the world coordinate system at the second time based on the pose of the head module coordinate system with respect to the world coordinate system at the second time, and the mapping operator;
determining a head pose value of the user at the second time, for each of the further first image and the further second image, based on the pose of the head module coordinate system with respect to the world coordinate system at the second time and the pose of the respective first camera or second camera in the world coordinate system; and
annotating the first further image and the second further image with the respective head pose value.

According to a seventh aspect of the present disclosure, there is provided a method for determining a pose of a fixed screen with respect to one or more fixed cameras for eye gaze tracking, the method comprising:
receiving a fixed camera image from at least one of the one or more fixed cameras, each fixed camera image comprising a physical fiducial;
determining a three-dimensional, 3D, pose of the physical fiducial reference in a world coordinate system based on the dimensions and pose of the physical fiducial reference in each fixed camera image;
receiving one or more roving images from a mobile camera, each roving image comprising the physical fiducial reference and a virtual fiducial reference displayed at a predetermined position on the fixed screen;
determining a 3D geometrical relationship between the physical fiducial reference and the virtual fiducial reference based on the dimensions and pose of each of the physical fiducial reference and the virtual fiducial reference in each roving image;
determining the pose of the fixed screen with respect to the world coordinate system based on the 3D pose of the physical fiducial reference in the world coordinate system and the 3D geometrical relationship between the physical fiducial reference and the virtual fiducial reference; and
performing an eye gaze tracking operation and/or a head-pose tracking operation on images, received from the one or more fixed cameras, of a user viewing the screen, using the pose of the fixed screen with respect to the world coordinate system.

The physical fiducial reference may be positioned in a field of view of the fixed camera.

The physical fiducial reference and the virtual fiducial reference may each have known dimensions and a plurality of features for identifying a distance from a camera to the fiducial reference and an orientation of the fiducial reference.

The physical fiducial reference and the virtual fiducial reference may each comprise a Charuco target.

Each of the one or more fixed cameras may have a different known pose in the world coordinate system.

The one or more fixed cameras may comprise a plurality of fixed cameras. Receiving at least one fixed camera image may comprise receiving a plurality of fixed camera images from the plurality of fixed cameras. Determining the 3D pose of the physical fiducial reference may comprise:
  determining, for each fixed camera image, coarse 3D pose values of the physical fiducial reference based on the dimensions and pose of the physical fiducial reference in the fixed camera image; and
  determining the 3D pose of the physical fiducial reference by averaging the coarse 3D pose values of the plurality of fixed camera images or performing an optimisation routine to reduce a total error between the 3D pose of the physical fiducial reference and the coarse 3D pose values of the plurality of fixed camera images.

The one or more fixed cameras may comprise a plurality of fixed cameras. Receiving at least one fixed camera image may comprise receiving a plurality of fixed camera images from the plurality of fixed cameras. Determining the 3D pose of the physical fiducial reference may comprise triangulating the 3D pose of the physical fiducial reference based on the pose of the fiducial reference in each fixed camera image.

The one or more roving images may comprise a plurality of roving images captured with the mobile camera at a corresponding plurality of different poses. Determining the 3D geometrical relationship between the physical fiducial reference and the virtual fiducial reference may comprise:
  determining, for each roving image, a coarse 3D geometrical relationship value between the physical fiducial reference and the virtual fiducial reference based on the dimensions and pose of each of the physical fiducial reference and the virtual fiducial reference in the roving image; and
  determining the 3D geometrical relationship between the physical fiducial reference and the virtual fiducial reference by averaging the 3D coarse geometrical relationship values of the plurality of roving images or performing an optimisation routine to reduce a total error between the 3D geometrical relationship between the physical fiducial reference and the virtual fiducial reference and the coarse 3D geometrical relationship values of the plurality of roving images.

Each of the one or more fixed cameras may comprise near infra-red cameras. The mobile camera may comprise a visible camera.

Performing the eye gaze tracking operation may comprise:
  receiving images of the user viewing a gaze reference marker on the fixed screen from the plurality of fixed cameras.

The method may further comprise:
  determining a gaze of the user by determining a gaze origin of the user in the world coordinate system by processing the captured images with an eye-tracking algorithm and determining a gaze ray from the gaze origin to the reference marker in the world coordinate system; or
  estimating an accuracy of an eye-gaze tracking algorithm by comparing a calculated gaze ray, calculated by processing a captured image with the eye-gaze tracking algorithm, with the position of the reference marker in the world coordinate system.

According to an eighth aspect of the present disclosure, there is provided a method of generating training images for a machine learning head-pose detection algorithm, the method comprising:
  for each of a plurality of different illuminator sets comprising at least one of a plurality of illuminators, wherein each of the plurality of illuminators is arranged at a different pose in a camera coordinate system to illuminate a user's head,
    setting each illuminator of the illuminator set to an on state and setting the remaining illuminators of the plurality of illuminators to an off state; and
    controlling a plurality of cameras, each arranged at a different fixed pose in the world coordinate system, to capture an image set comprising an image from each camera of the user's head;
  determining a head pose of the user's head with respect to the world coordinate system based on the pose of a head module fiducial reference in each image of at least one image set and the pose of each fixed camera in the world coordinate system; and
  generating a plurality of training images by annotating each image in each image set with an image head pose value based on the head pose of the user with respect to the world coordinate system and the pose of the respective camera in the world coordinate system.

According to a ninth aspect of the present disclosure, there is provided a method for assessing an accuracy of a trained machine learning head pose detection and eye gaze algorithm for a remote eye tracking system, the method comprising:
  receiving a first image captured by a mobile camera arranged in a first pose in an environment of the remote eye tracking system, wherein the first image includes a first plurality of fiducial references comprising a first subset of a total plurality of fiducial references, and wherein each fiducial reference of the total plurality of fiducial references has:
    known dimensions and a plurality of features for identifying a three-dimensional, 3D, pose of the fiducial reference in a mobile camera coordinate system, from a camera image; and
    a fixed pose in the environment of the remote eye tracking system;
  determining the 3D pose of each fiducial reference of the first subset in a first coordinate system, corresponding to the mobile camera coordinate system when the mobile camera is arranged in the first pose, based on the dimensions and a pose of the respective fiducial reference in the first image;
  receiving a second image captured by the mobile camera arranged in a second pose in the environment, wherein the second image includes a second plurality of fiducial references comprising a second subset of the total plurality of fiducial references and wherein the first subset and the second subset each comprise at least one common fiducial reference;
  determining the 3D pose of each fiducial reference of the second subset in a second coordinate system, corresponding to the mobile camera coordinate system when the mobile camera is arranged in the second pose, based on the dimensions and pose of the respective fiducial reference in the second image;
determining the relative 3D pose of each fiducial reference of the first and second subsets, in an environment coordinate system, based on:
the 3D pose of each fiducial reference of the first subset in the first coordinate system;
the 3D pose of each fiducial reference of the second subset in the second coordinate system; and
a difference between the 3D pose of the at least one common fiducial reference in the first coordinate system and the second coordinate system;
receiving a third image captured by a camera arranged in a fixed user monitoring pose in the environment, wherein the third image includes a third plurality of fiducial references comprising a third subset of the total plurality of fiducial references and wherein the third subset comprises at least one further common fiducial reference of the first subset and/or the second subset;
determining the 3D pose of each fiducial reference of the third subset in a monitoring coordinate system based on the dimensions and pose of the respective fiducial reference in the third image;
determining the 3D pose of each fiducial reference of the first and second subset in the monitoring coordinate system based on:
the relative 3D pose of each fiducial reference of the first and second subsets in the environment coordinate system; and
the difference between the 3D pose of the at least one further common fiducial reference in the environment coordinate system and the monitoring coordinate system;
receiving further images captured by the camera in the fixed user monitoring pose, wherein each further image includes a user looking at a different test fiducial marker of the total plurality of fiducial references;
for each further image:
determining a gaze ray of the user in the monitoring coordinate system by processing the further image using the trained machine learning head pose detection and eye gaze algorithm; and
determining an error of the gaze ray based on a minimum distance from the gaze ray to the 3D position of the test fiducial marker; and
estimating an accuracy of the trained machine learning head pose detection and eye gaze algorithm based on the error of the gaze ray of each further image.

The second pose may be different to the first pose.

The method may comprise, for each further image, determining a head pose value and a gaze ray of the user in the monitoring coordinate system by processing the further image using the trained machine learning head pose detection and eye gaze algorithm.

The camera may be the mobile camera or a fixed driver monitoring camera.

The fiducial references may comprise Aruco markers.

The environment coordinate system may be the first coordinate system or the second coordinate system. The monitoring coordinate system may correspond to a camera coordinate system when the camera is arranged in the fixed user monitoring pose in the environment.

There may be provided a computer program, which when run on a computer, causes the computer to configure any apparatus, including a circuit, controller, converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

BRIEF DESCRIPTION OF THE DRAWINGS

One or more embodiments will now be described by way of example only with reference to the accompanying drawings in which.

DETAILED DESCRIPTION

Figure 1:
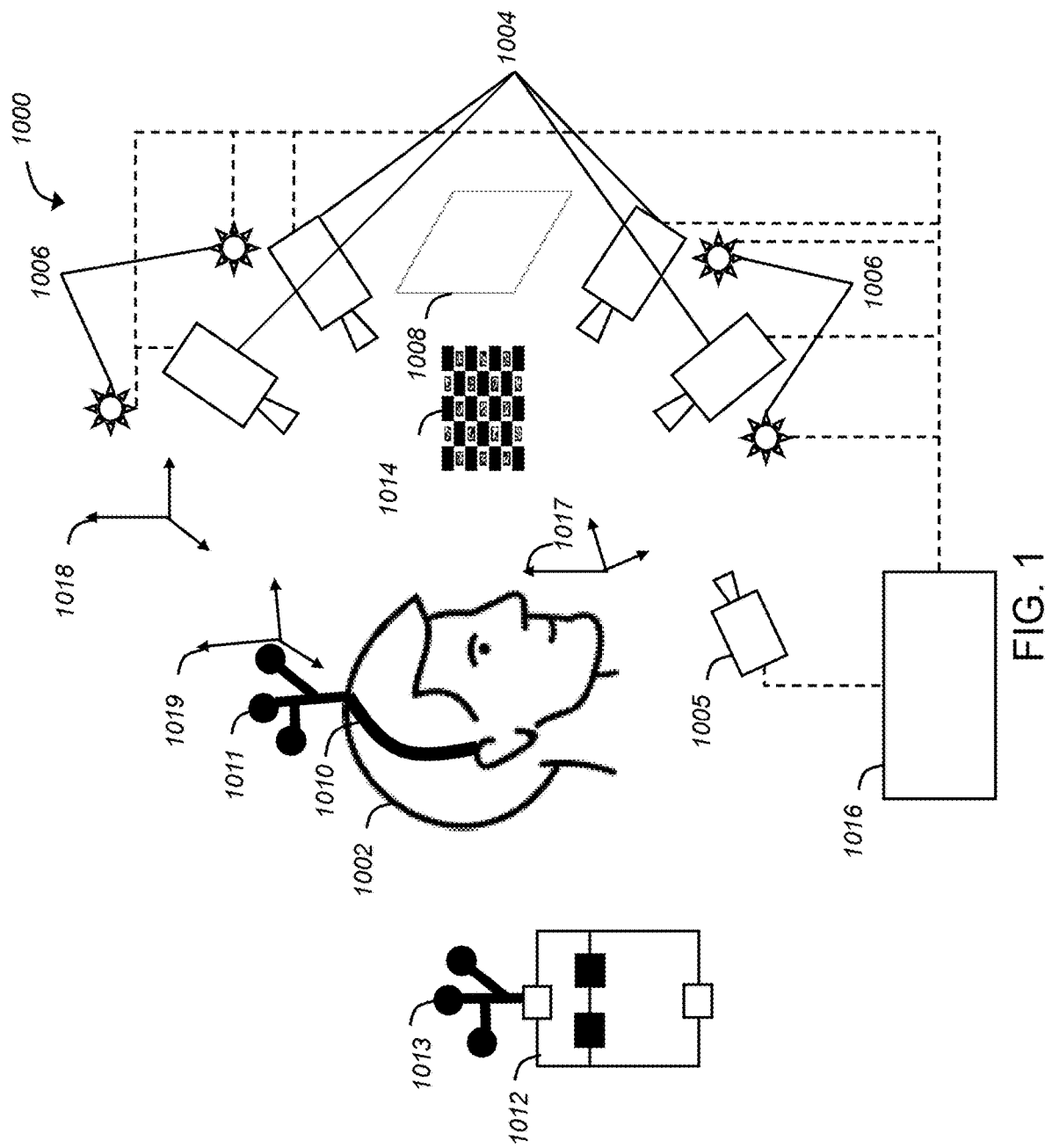
FIG. 1 illustrates a system for generating training images for a ML head-pose algorithm for a remote eye tracking system according to an embodiment of the present disclosure.

FIG. 1 illustrates a system 1000 for generating training images for a ML head-pose algorithm for a remote eye tracking system according to an embodiment of the present disclosure.

In general, the system 1000 enables the collection of raw image data from a range of angles and under different illumination conditions. This can provide for a rapid acquisition of a rich source of training data for a head pose machine-learning, ML, algorithm.

The system 1000 comprises a user location 1002, a plurality of fixed cameras 1004, a roving camera 1005, a plurality of illuminators 1006, a screen 1008, a motion-capture head module 1010 (which may be referred to herein as head module 1010, and may also be referred to as a motion capture head unit or a motion capture head device), a head-axis calibration device 1012 (which may be referred to herein as simply calibration device 1012), a screen position calibration device 1014 and a processor 1016.

The plurality of fixed cameras 1004 are arranged at different known positions and orientations (pose) within a world coordinate system 1018. The world coordinate system may correspond to a coordinate system of the system 1000 in which the pose of each camera 1004 is known. The world coordinate system may be defined as a camera coordinate system of one of the plurality of fixed cameras 1004. The cameras 1004 are arranged to image a user's head positioned at the user location 1002. The plurality of fixed cameras may be near infra-red cameras for imaging the user's head at NIR wavelengths.

The roving camera 1005 or mobile camera can be repositioned around the world coordinate system 1018. The roving camera 1005 may be a visible light camera for capturing images at visible wavelengths.

The plurality of fixed cameras 1004 and the roving camera 1005 are coupled to the processor 1016 via wired or wireless means and appropriate interface hardware and software, such that the processor 1016 can receive images from the plurality of fixed cameras 1004 and the roving camera.

One or more of the plurality of illuminators 1006 may be arranged (substantially) co-axially with a corresponding fixed camera 1004. In this way, reflections of the illuminator light from markers (particularly reflective markers) on the head module 1010 or calibration device 1012 can be captured well by the fixed camera. The plurality of illuminators 1006 are coupled to the processor 1016 via wired or wireless means and appropriate interface hardware and software, such that the processor 1016 can independently control an intensity of each illuminator 1006.

The screen 1008 is also coupled to the processor 1016 via wired or wireless means and appropriate interface hardware and software, such that the processor 1016 can control a display on the screen 1008.

Figure 2:
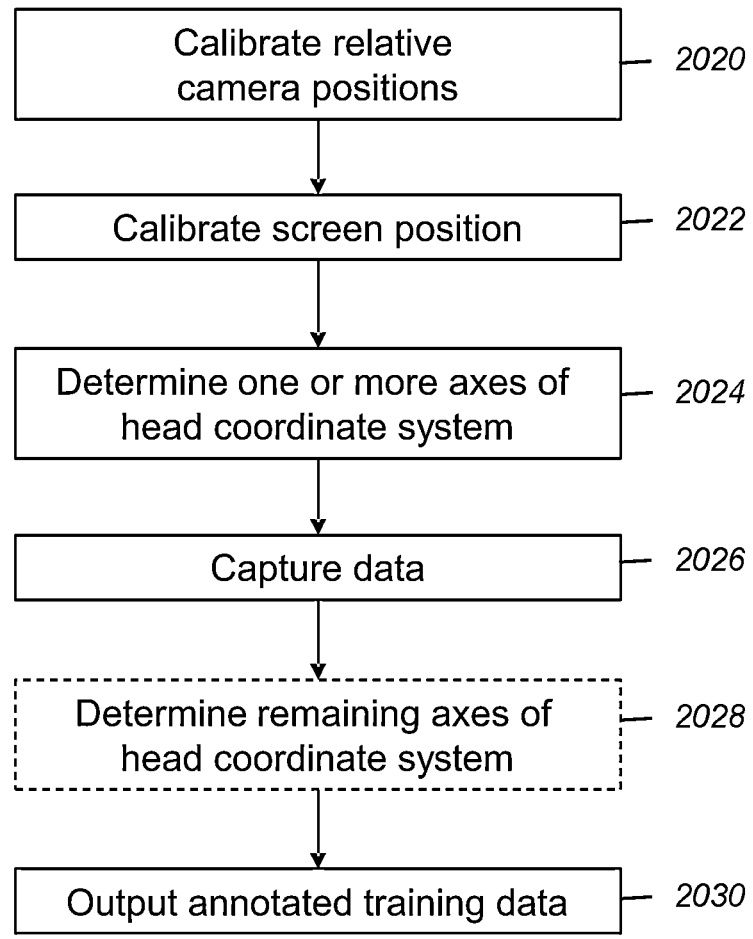
FIG. 2 illustrates a method of generating training images for a ML head-pose algorithm for a remote eye tracking system according to an embodiment of the present disclosure.

FIG. 2 illustrates a method of generating training images for a ML head-pose algorithm for a remote eye tracking system according to an embodiment of the present disclosure. Steps of the method will be described with continuing reference to FIG. 1.

The method generally involves capturing, with each camera 1004, a sequence of images of the user wearing the motion-capture head module 1010 to track the relative motion of the user's head. The motion-capture head module 1010 defines a head module coordinate system 1019 whose pose varies in a world coordinate system 1018 as the user moves their head. The term pose as used herein shall refer to the position and orientation of the corresponding feature (object, coordinate system). Calibration steps are used to map the head module coordinate system 1019 to an actual head coordinate system 1017 of the user, wherein the head coordinate system 1017 has universally defined axes (across different users). For example, an eye axis may be defined as running from a centre of rotation of a first eye to a centre of rotation of a second eye, a vertical axis may be defined as running from a user's sellion to the centre of a chin, a third axis may be defined perpendicular to the eye-axis and the vertical axis, and an origin of the head coordinate system 1017 may be defined as the equidistant point between the two centres of rotation of the eyes. The head module coordinate system 1019 and the head coordinate system 1017 will move synchronously with respect to the world coordinate system 1018 as the user moves their head. Therefore, the head coordinate system 1017 can be determined from the pose of the head module 1010 in the world coordinate system 1018 and the mapping between the head module coordinate system 1019 and the head coordinate system 1017. The calibration steps advantageously allow for variation in the position and orientation that the head module 1010 is arranged on different user's heads.

A first step 2020 of the method comprises calibrating the relative positions of the plurality of fixed cameras 1004. The first step 2020 may comprise positioning a fiducial reference (such as the screen position calibration device 1014) in the field of view of each of the plurality of cameras 1004; capturing an image of the fiducial reference with each camera 1004; and determining (using the processor 1016) a relative 3-dimensional (3D) pose of each camera 1004 based on the 2-dimensional (2D) position and orientation of the fiducial reference in each captured image. The fiducial reference may comprise one or more fiducial markers with predetermined dimensions for enabling a distance and orientation determination. Example fiducial references include: a plurality of motion capture spheres; a checkerboard pattern; a Charuco target; an Aruco marker or other known fiducial references. The relative 3D positions and orientations of the plurality of fixed cameras 1004 may be defined with respect to the world coordinate system 1018. For example, an origin of the world coordinate system 1018 may comprise a position of one of the cameras and the axes of the world coordinate system 1018 may comprise three perpendicular axes defined with any arbitrary orientation.

A second step 2022 of the method comprises calibrating a position of the screen 1008. Specific details of step 2022 are provided below. In brief, the step 2022 comprises: receiving one or more fixed images of a physical fiducial reference 1014 using at least one of the plurality of fixed cameras 1004; determining a 3D pose of the physical fiducial reference 1014 in the world coordinate system 1018 based on the dimensions and pose of the physical fiducial reference 1014 in the one or more fixed images; receiving one or more roving images of the physical fiducial reference 1014 and a virtual (or digital) fiducial reference displayed on the screen 1008 using the mobile camera 1005; determining a geometrical relationship between the physical and virtual fiducial references based on the dimensions and poses of each of the physical and virtual fiducial references in the roving images; and determining the pose of the screen in the world coordinate system 1018 based on the geometrical relationship between the physical and virtual fiducial references and the pose of the physical fiducial reference 1014 in the world coordinate system 1018.

A third step 2024 of the method comprises determining one or more axes of the head coordinate system 1017 using the head-axis calibration device 1012. Specific details of step 2024 are provided below. In brief, the step 2024 comprises: aligning the head-axis calibration device 1012 with a head of the user, the head-axis calibration device 1012 comprising a calibration device fiducial reference 1013 with a predetermined geometrical relationship to at least one axis of the head-axis calibration device 1012; receiving a first image captured by a first fixed camera 1004 at a first time, and a second image captured by a second fixed camera 1004 at the first time, of the user; determining a 3D position and orientation of the at least one axis of the head-axis calibration device 1012 based on the 2D pose of the calibration device fiducial reference 1013 in the first image and in the second image; determining at least one axis of the head coordinate system 1017, with respect to the world coordinate system 1018, based on the at least one axis of the head-axis calibration device 1012.

As discussed in detail below, the third step 2024 may be performed with the user wearing the motion-capture head module 1010. The motion-capture head module 1010 may comprise a head module fiducial reference 1011 and the method step 2024 may further comprise determining the pose of the head module coordinate system 1019 (with respect to the world coordinate system 1018) based on the 2D pose of the head module fiducial reference 1011 in the first image and in the second image. An output of the third step may comprise the at least one axis of the head-coordinate system 1017 in the head module coordinate system 1019. In examples, where the at least one axis of the head-coordinate system 1017 comprises all three axes of the head coordinate system 1017, the output may comprise a mapping operator, which may also be referred to as a predetermined transformation operator or a predetermined transform, for transforming the head module coordinate system 1019 to the head coordinate system 1017. The mapping operator may comprise a matrix for multiplying with the head module coordinate system 1019 to obtain the head coordinate system 1017.

A fourth step 2026 comprises capturing data, which may comprise capturing a plurality of raw images with each camera 1004. The fourth step 2026 may further comprise instructing the user to look at one of a plurality of reference points, for example on the screen 1008 or at other locations around the system 1000. Raw images captured by each camera 1004 at the same time point may form a raw image set (a raw image pair in the specific embodiment of two cameras). For the fourth step 2026, the user may continue to wear the motion capture head module 1010 from the third step 2024 in the absence of the head-axis calibration unit 1012. In other words, following the third step 2024, the user may remove the head-axis calibration unit 1012 and continue to wear the head module 1010 (without adjustment). As discussed further below, the fourth step 2026 may further comprise capturing the plurality of raw images under a range of different illumination conditions. The range of illumination conditions may be provided by adjusting, for example using the processor 1016, a brightness of each of the plurality of illuminators 1006.

An optional fifth step 2028 comprises determining any remaining axes of the head-coordinate system 1017 with respect to the head module coordinate system 1019. Use of the fifth step 2028 depends upon the type of head-axis calibration device 1012 used in the third step 2024. If a two-axis head-axis calibration device 1012 is used in step 2024, then all three axes of the head coordinate system 1017 and the mapping operator may be determined (with respect to the head module coordinate system 1019) in step 2024. However, if a single axis head-axis calibration device 1012 is used, then only one axis of the head coordinate system 1017 (with respect to the head module coordinate system 1019) may be determined in step 2024. As a result, step 2028 determines the remaining axes of the head coordinate system 1017 (with respect to the head module coordinate system 1019) using a plurality of the raw image sets captured during step 2026. Specific detail of step 2028 is described below. In brief, step 2028 comprises: annotating a first pupil position of a first eye of the user and a second pupil position of a second eye of the user in each image of the raw image sets; determining the pose of the head module coordinate system 1019 with respect to the world coordinate system 1018 for each raw image set; determining a first centre of rotation of the first eye and a second centre of rotation of the second eye in the head module coordinate system 1019 based on: the annotated pupil positions; the pose of the head module coordinate system 1019 with respect to the world coordinate system 1018; and the known position of the reference point, of each image from at least one camera 1004; and determining an eye axis of the head coordinate system 1017, with respect to the head module coordinate system 1019, as a vector between the first and second centre of rotations. The step 2028 may further comprise determining an origin of the head coordinate system 1017 as the 3D position equidistant between the first centre of rotation and the second centre of rotation. The step 2028 may further comprise determining the mapping operator for transforming from the head module coordinate system 1019 to the head coordinate system 1017 based on: the origin of the head coordinate system 1017 with respect to the head module coordinate system 1019, the eye-axis of the head coordinate system 1017, the vertical axis of the head coordinate system 1017 (determined in step 2024), and a third axis perpendicular to the eye-axis and the vertical axis.

A sixth step 2030 comprises outputting annotated training images. The sixth step 2030 may comprise, for each raw image set captured in step 2026 by the plurality of cameras 1004: determining the 3D pose of the head module coordinate system 1019 with respect to the world coordinate system 1018, based on the 2D pose of the head module fiducial reference 1011 in each image of the raw image set; determining the 3D pose of the head coordinate system 1017 based on the 3D pose of the head module coordinate system 1019 and the mapping operator; and annotating each image of the raw image set with the 3D pose of the head coordinate system 1017 to provide the training data. The 3D pose of the head coordinate system 1017 with respect to the world coordinate system provides head pose values in the world coordinate system 1018 for each raw image set. The sixth step may further comprise transforming the 3D pose of the head coordinate system in the world coordinate system to a specific camera coordinate system of each of the plurality of cameras 1004 to determine corresponding specific head pose values for each image in a raw image set based on the pose of the respective camera 1004 in the world coordinate system 1018.

It will be appreciated that steps 2020 may not be performed in the order illustrated. For example, step 2026 may be performed first and capture all data necessary for subsequently performing calibration steps 2020, 2022, 2024, 2028 and annotation step 2030.

Different embodiments of the components of the system 1000 and different embodiments of the method steps 2022 to 2030 are described in detail below.

Motion Capture Head Module 1010

Figure 3:
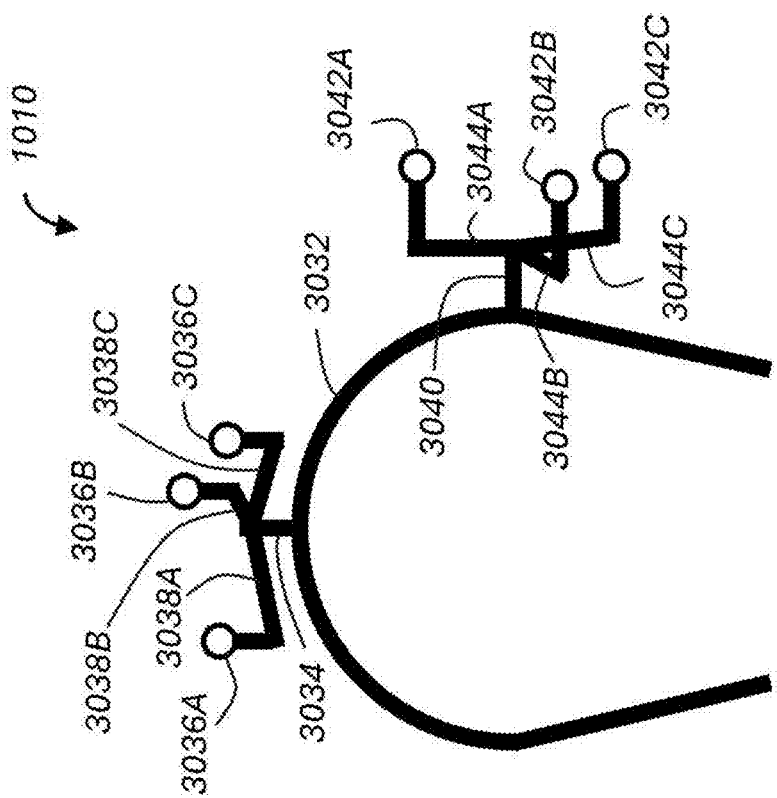
FIG. 3 illustrates a motion-capture head module according to an embodiment of the present disclosure.

FIG. 3 illustrates a motion-capture head module 1010 according to an embodiment of the present disclosure. The head module 1010 can be used to track a relative pose of a user's head in a series of image sets captured by the plurality of fixed cameras 1004.

The motion-capture head module 1010 comprises a headband 3032 for attaching to the user's head. The headband 3032 includes a head contact side for facing and contacting the surface of the user's head and a non-head contact side opposite for facing away from the user's head. The motion-capture head module 1010 further comprises a post 3034 extending from a non-head contact side of the headband 3032 and at least three markers 3036A, 3036B, 3036C (which may collectively be referred to as markers 3036). Each marker 3036 is coupled to a distal end of the post 3034 by a respective branching member 3038A, 3038B, 3038C (which may be collectively referred to as members 3038). As a result, the at least three markers 3036 have a fixed geometrical relationship with respect to each other and can define a marker plane. The at least three markers 3036 may form the head module fiducial reference 1011.

The headband 3032 may comprise a flexible material such that the headband can be deformed to fit different sizes of heads. The post 3034 and branching members 3038 may comprise a rigid material. By coupling the at least three markers 3036 to the headband via the post 3034, the at least three markers 3036 advantageously maintain the fixed geometric relationship with respect to each other regardless of any deformation of the headband 3032. In this way, the position of each marker 3036 can be triangulated and each marker 3036 can be individually identified based on the fixed geometrical relationship to track the relative pose of the user's head (as discussed further below). Furthermore, providing the post 3034 advantageously offsets the at least three markers 3036 from the user's head, reducing the risk of occlusion of the markers 3036 by the user's head during large head rotations. Therefore, the head module of FIG. 3 can advantageously track larger rotations of the user's head.

The fixed geometrical relationship may comprise a non-symmetrical (irregular) and non-linear relationship. In other words, the at least three markers 3036 are not all colinear and a distance from a first marker 3036A to a second marker 3036B may differ from both: a distance from the second marker 3036B to a third marker 3036C; and a distance from the first marker 3036A to the third marker 3036C. For the specific case of three markers 3036, the positions of the markers 3036 may define an irregular triangle on the marker plane. Providing an irregular geometrical relationship enables identification of each specific marker 3036 based on the triangulated positions of the three markers 3036. In other examples, the markers 3036 may have different sizes and/or shapes to enable specific identification.

In this example, the at least three markers 3036 comprise reflective markers 3036. The reflective markers 3036 may comprise retro-reflective markers and/or may comprise motion-capture spheres. The reflective markers 3036 can advantageously reflect light at near infra-red, NIR, wavelengths. In other examples, the markers may comprise coloured markers for use with visible fixed cameras 1004. Each marker 3036 may comprise a different colour or may be multicoloured to aid pose determination. The headband 3032, post 3034 and/or members 3038 may comprise a radiation absorbing material, such as a NIR absorbing material. The headband may comprise a NIR absorbing paint.

In this example, the motion capture head module 1010 further comprises: a second post 3040 extending from a different point on the non-head contact side of the headband 3032; and at least three further markers 3042A, 3042B, 3042C (collectively referred to as further markers 3042). In this example, each further marker 3042 comprises a reflective marker. Each further reflective marker 3042 is coupled to the distal end of the second post 3040 by a respective one of at least three further branching members 3044A, 3044B, 3044C (collectively referred to as further members 3044) extending from the distal end of the second post 3040, such that the at least three further reflective markers 3042 have a further fixed geometrical relationship with respect to each other defining a further marker plane.

The further fixed geometrical relationship may be non-linear and non-symmetric (irregular) in the same way as described above for the fixed geometrical relationship of the markers 3036. As also described above, the further reflective markers 3042 may have different sizes and/or shapes to enable specific identification. The further fixed geometrical relationship may be different to the fixed geometrical relationship.

As described below, providing the at least three further reflective markers 3042 provides a number of additional advantages. Firstly, the additional reflective numbers at a different point on the headband 3032 further reduces the risk of occlusion by the user's head during large head rotations. In particular, as long as any three reflective markers 3036, 3042 can be seen in a camera image, the head module coordinate system 1019 can be determined. Secondly, by providing two separate clusters of reflective markers 3036, 3042, a deformation of the headband can be determined which can assist with painting over the head module 1010 to improve the resulting training images.

Figure 4:
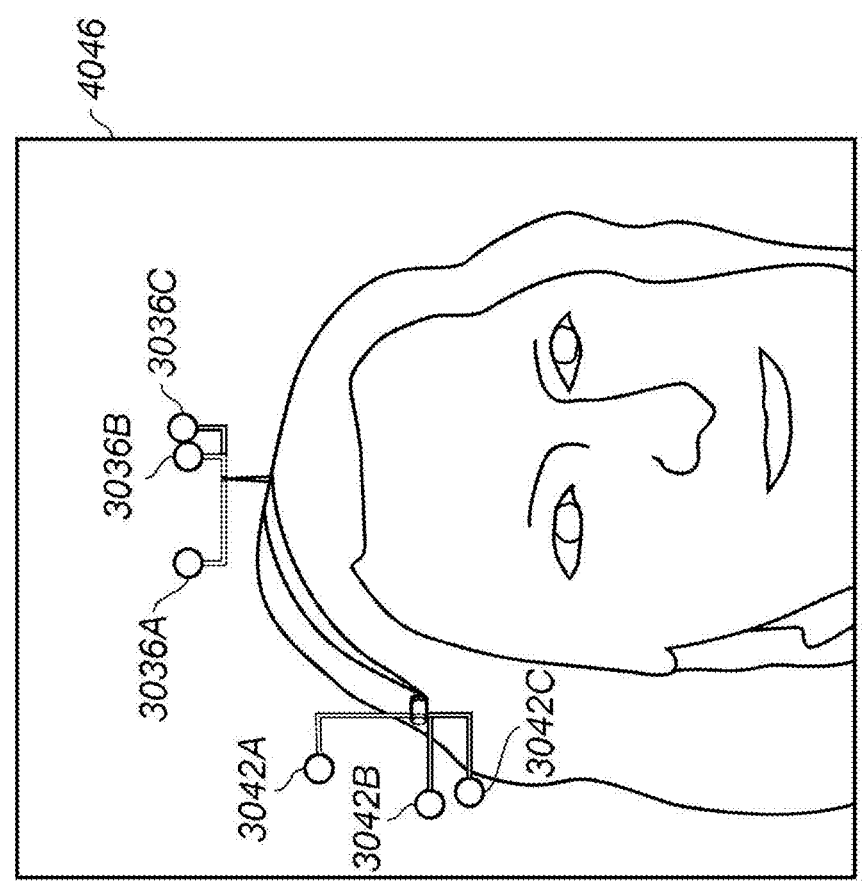
FIG. 4 illustrates an example image of a user wearing the motion-capture head module of FIG. 3.

FIG. 4 illustrates an example image 4046 of a user wearing the motion-capture head module 1010 of FIG. 3, captured by one of the plurality of cameras 1004. The image has been a captured by a NIR camera 1004 under NIR illumination from the plurality of NIR light sources 1006. The reflective markers 3036A, 3036B, 3036C and the further reflective markers 3042A, 3042B, 3042C can be seen as bright white circles in the vicinity of the user's head.

Head Tracking With a Motion Capture Head Module 1010

Head tracking with the motion capture head module 1010 may be performed in, or across, any of steps 2024, 2026 and 2028 of FIG. 2. In general, tracking the pose of a user's head position can be achieved by tracking the 3D pose of a head module fiducial reference 1011 fixed with respect to the user's head by triangulating the fiducial reference 1011 using images from the plurality of fixed cameras 1004. For example, the motion-capture head module 1010 of FIG. 3 provides a head module fiducial reference (the at least three markers 3036) fixed with respect to the user's head (via the headband 3032).

It will be appreciated that triangulation of features in 2D images is known and generally comprises, for a plurality of fixed cameras 1004 each with a known pose in the world coordinate system 1018: (i) back-projecting through the position of the feature in the 2D image to define a camera ray in the world coordinate system 1018 (using the known pose of the respective camera, the angular field of view of the camera/image and the 2D pixel location of the feature); and (ii) determining the 3D coordinates of the feature (in the world coordinate system 1018) based on the intersection point of camera rays from different cameras 1004. In step (i), the camera ray may first be determined in the local/specific camera coordinate system of the respective camera by performing the back-projection in the local camera coordinate system, before transforming the ray to the world coordinate system 1018 based on the pose of the respective camera in the world coordinate system 1018.

The head module fiducial reference 1011 may comprise any fiducial reference that comprises at least three identifiable features with a known geometrical relationship (a non-colinear relationship) to each other. For example, the fiducial reference may include a plurality of reflective markers (such as those used in the unit of FIG. 3); plurality of motion capture spheres; a checkerboard pattern; a Charuco target; an Aruco marker or other known fiducial references.

Figure 5:
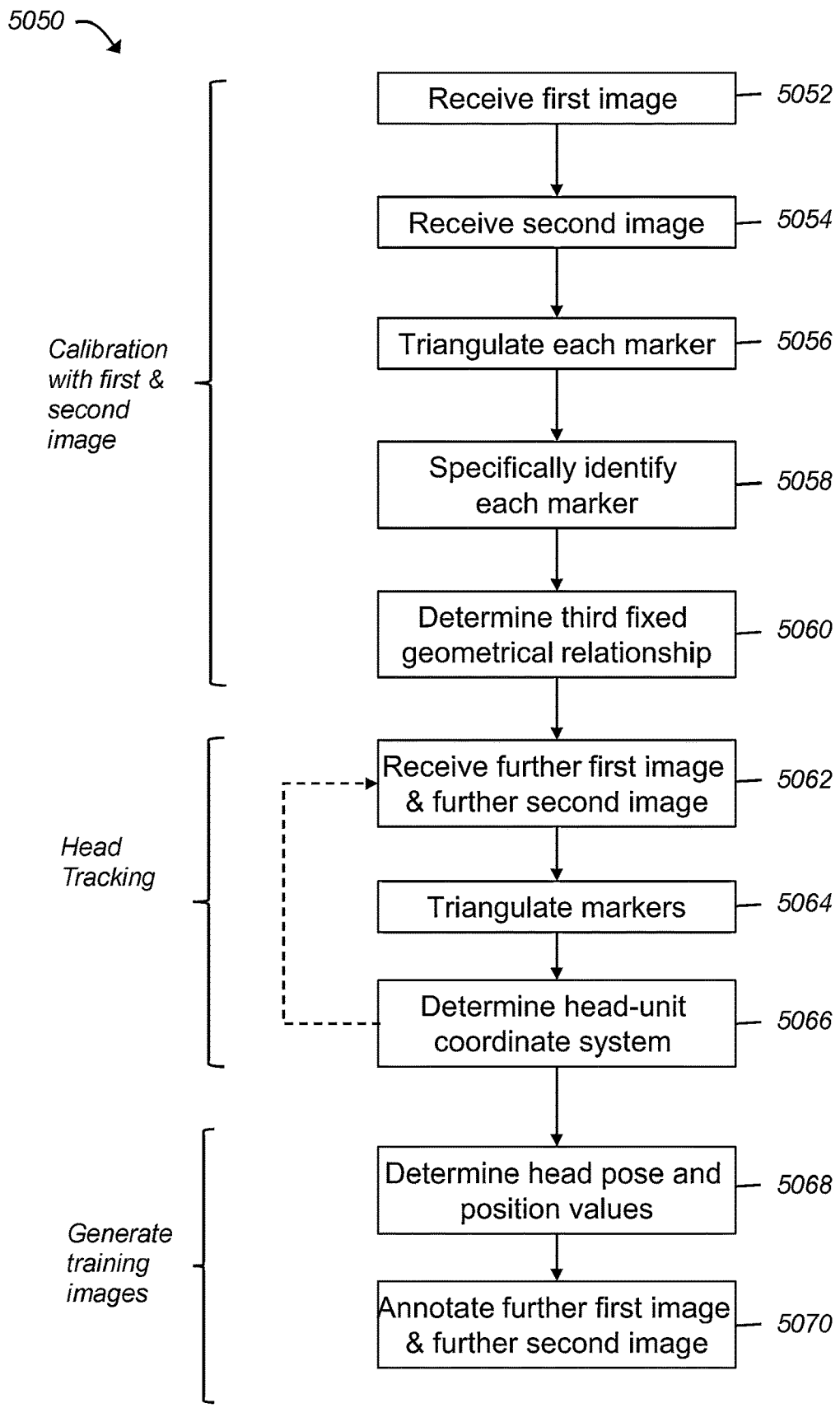
FIG. 5 illustrates an example method of head tracking using a motion-capture head module with two clusters of three reflective markers, according to an embodiment of the present disclosure.

FIG. 5 illustrates an example method 5050 of head tracking using a motion-capture head module 1010 with two clusters of three reflective markers, according to an embodiment of the present disclosure. The method 5050 will be described with continuing reference to FIGS. 2 to 4.

The method 5050 relates to the use of two separate clusters of three or more reflective markers for improving the head tracking at large head rotations by reducing the effect of marker occlusion. As noted, the method 5050 may be used for tracking relative head movement.

A first step 5052 comprises receiving a first image (such as image 4046) captured by a first camera of the plurality of cameras 1004 at a first time, wherein the first image is of a user wearing a motion-capture head module 1010. The motion-capture head module 1010 comprises: a head band 3032; a first cluster of reflective markers 3036 comprising a first reflective marker 3036A, a second reflective marker 3036B and a third reflective marker 3036C, having a first fixed geometrical relationship with each other; and a second cluster of reflective markers 3042 comprising a fourth reflective marker 3042A, a fifth reflective marker 3042B and a sixth reflective marker 3042C, having a second fixed geometrical relationship with respect to each other. The motion-capture head module may comprise the motion capture head module 1010 of FIG. 3, for example. The first and/or second clusters of reflective markers 3036, 3042 may be considered as the head module fiducial reference 1011.

A second step 5054 comprises receiving a second image (similar to image 4046 but from a different angle) captured by a second camera of the plurality of cameras 1004 at the first time, wherein the second image is of the user wearing the motion-capture head module 1010. In other words, the first image and the second image are captured simultaneously. The first and second images capture each of the first to sixth reflective markers 3036, 3042.

In this example, the first and second cameras each have a known pose in the world coordinate system 1018.

A third step 5056 comprises triangulating 3D coordinates of each reflective marker 3036, 3042 in the world coordinate system 1018 based on the 2D position (or pose) of each reflective marker 3036, 3042 in each of the first image and the second image (and the known pose (and angular field of view) of the respective camera in the world coordinate system 1018). As described above, triangulation of the 3D coordinates may be achieved using back-projection.

A fourth step 5058 comprises individually/specifically associating or identifying each 3D coordinate with a respective one of the first to sixth reflective markers 3036, 3042 based on the first and second fixed geometrical relationships. The first and second fixed geometrical relationships may be irregular (non-symmetric) to enable the specific association. For example, distances between pairs of the triangulated 3D coordinates may be matched to corresponding distances between pairs of markers 3036, 3042 in the known irregular first and second fixed geometrical relationships. In some examples, the second fixed geometrical relationship may be different to the first fixed geometrical relationship to enable differentiation of the first cluster from the second cluster. Alternatively, or in addition, each of the reflective markers 3036, 3042 (within a cluster or across both clusters) may have a different marker size to enable the specific association.

A fifth step 5060 comprises determining a third fixed geometrical relationship between each of the first to sixth reflective markers 3036, 3042 based on the associated 3D coordinates of each reflective marker 3036, 3042. In other words, the third fixed geometrical relationship defines the relative coordinates of each of the six markers 3036, 3042. In this way, the third geometrical relationship defines a composite object comprising each marker of the first and second cluster. As a result, the third fixed geometrical relationship can be used to track future head movement using images in which only a subset of the six markers 3036, 3042 are visible. Determining the third fixed geometrical relationship while the user is wearing the headband 3032 enables the use of a flexible headband 3032 for which the third fixed geometrical relationship will vary depending upon the size of a user's head and the resulting deformation of the headband 3032. The third fixed geometrical relationship may define the head module fiducial reference 1011 and/or the head module coordinate system 1019.

Steps 5052 to 5060 relate to calibration of the head module 1010 by determination of the third fixed geometrical relationship using images in which all six markers 3036, 3042 are visible. Steps 5052 to 5060 may be performed as part of step 2024 or may be performed prior to step 2024. The sixth to eighth steps relate to receiving further images in which only a subset of the six markers 3036, 3042 may be visible, and determining the head module coordinate system 1019 based on the subset of markers 3036, 3042 to track motion of the user's head. Steps 5052 to 5060 may be performed as part of any of steps 2024 to 2028.

A sixth step 5062 comprises receiving a further first image captured by the first camera and a further second image captured by the second camera, of the user wearing the motion-capture head module 1010 at a second time. The further first image and the further second image may comprise a large rotation of the user's head such that only a subset of the six markers 3036, 3042 are visible in both images.

A seventh step 5064 comprises triangulating the 3D coordinates of at least three reflective markers of the first to sixth reflective markers 3036, 3042 in the world coordinate system 1018 based on the 2D position (or pose) of each of the at least three reflective markers in each of the further first image and the further second image (and the known pose (and angular field of view) of the respective camera in the world coordinate system 1018).

An eighth step 5066 comprises determining a pose of the head module coordinate system 1019 with respect to the world coordinate system 1018 based on the 3D coordinates of the at least three reflective markers 3036, 3042 and the third fixed geometrical relationship.

The pose of the head module coordinate system 1019 can be determined for yet further first and second images by repeating steps 5062 to 5066 to track the relative movement of the user's head (as indicated by the dashed looping arrow from step 5066 back to step 5062).

In some examples, each of the further images may be annotated with a head pose value (e.g., one or more numerical values defining position and orientation of the head) to provide labelled training data for training a ML head pose detection algorithm, as provided by steps 5068 and 5070.

A ninth step 5068 comprises determining a head pose value of the user's head for each of the further first image(s) and the further second image(s) based on the pose of the head module coordinate system 1019 and the pose of the respective first or second camera in the world coordinate system 1018. Determining the head pose value may comprise determining the head coordinate system 1017 by transforming the head module coordinate system 1019 using the mapping operator determined in steps 2024 and optionally 2028 (as discussed above and further below). The head pose value may then be determined for each of the further first image(s) and the further second image(s) by transforming the head coordinate system 1017 to a specific camera coordinate system for each of the respective first camera and second camera. The transformation from the world coordinate system 1018 to the specific camera coordinate system of a particular camera 1004 can be calculated based on the known pose of the respective camera 1004 in the world coordinate system 1018.

A tenth step 5070 comprises generating first and second training images by annotating each of the first further image(s) and the second further image(s) with the respective head pose value.

In some examples, the method may further comprise determining a deformation of the headband 3032 based on the specifically associated 3D coordinates of one or more reflective markers 3036, 3042 in each of the first cluster and the second cluster. A separation distance between the one or more markers 3036, 3042 in each cluster will vary depending upon deformation of the headband 3032. The method may further comprise: determining a 3D profile of the headband 3032 in the head module coordinate system 1019 based on the deformation of the headband; determining a 2D profile of the headband 3032 in each of the further first images and further second images based on a pose of the head module coordinate system 1019 with respect to the world coordinate system 1018 and the pose of the respective first or second camera in the world coordinate system 1018; and generating the first and second training images by painting over the 2D profile of the headband in the respective further first image or further second image.

As described herein, "painting over" a feature relates to the known technique of removing a feature from an image by interpolating the pixel values corresponding to the feature based on the pixel values surrounding the feature. Painting over the 2D profile of the headband may comprise changing the pixel intensity value for the outline of the flexible headband by interpolating it to the surrounding background.

The method may further comprise painting over each reflective marker 3036, 3042 in each further first image and further second image. The method may also comprise determining and painting over a 2D profile of any posts 3034, 3040 and/or branching members 3038, 3044 using the same approach as described above for the flexible headband.

Painting over the markers and headband to provide the training data advantageously avoids their presence influencing the training of the ML algorithm. This is important because when the end-use of the ML algorithm will be with users not wearing a headband.

Head-Axis Calibration Device 1012

Figure 6:
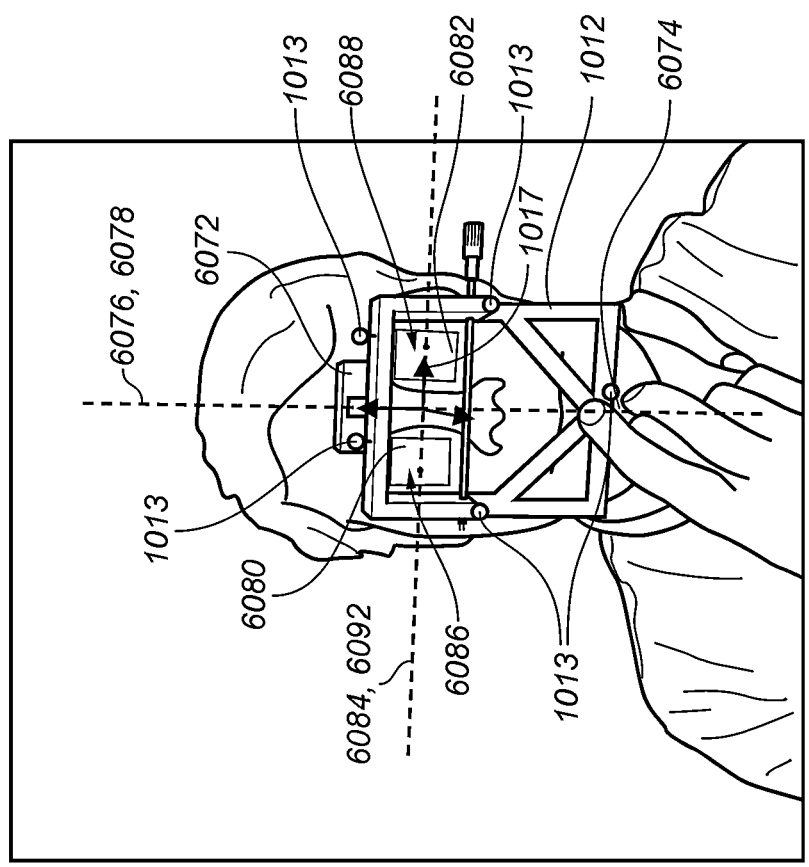
FIG. 6 illustrates a head axis calibration device aligned to the face of a user according to an embodiment of the present disclosure.

FIG. 6 illustrates a head axis calibration device 1012 aligned to the face of a user according to an embodiment of the present disclosure. The head-axis calibration device 1012 can provide a ground truth reference for the pose of a user's head. In other words, the device 1012 can enable determination of the pose of the head coordinate system 1017 with respect to the world coordinate system 1018.

The head-axis calibration device 1012 comprises vertical axis face engaging components 6072, 6074. The vertical axis face engaging components 6072, 6074 are aligned along a first axis 6076 of the calibration device 1012. The vertical axis face engaging components comprise a first vertical axis face engaging component 6072 for engaging a first feature along the vertical axis 6078 of the user's face. In this example, the first vertical axis face engaging component 6072 is a contact pad and the first feature comprises a central position of the forehead of the user. The vertical axis face engaging components further comprise a second vertical axis face engaging component 6074 for engaging a second feature along the vertical axis 6078 of the user's face. In this example, the second vertical axis face engaging component 6074 is a contact pad and the second feature comprises a central position of the chin of the user. The first and second features may comprise any of: a chine, a forehead, a sellion, a tip of the nose, a septum or a philtrum of the user.

The head-axis calibration device 1012 further comprises eye axis reference components 6080, 6082 aligned along a second axis 6084 of the calibration device 1012. In this example, the first axis 6076 is orthogonal to the second axis 6084. The eye axis reference components 6080, 6082 comprise a first adjustable eye axis reference component 6080 comprising a first visual reference 6086 for adjusting along the second axis 6084 of the calibration device 1012 to align with a first eye of the user. In this example the first visual reference 6086 comprises a pinhole in an opaque block. The eye axis reference components 6080, 6082 further comprise a second adjustable eye axis reference component 6082 comprising a second visual reference 6088 for adjusting along the second axis 6084 of the calibration device 1012 to align with a second eye of the use. In this example the second visual reference 6088 also comprises a pinhole in an opaque block. The first and second visual references are visible references that the user can see and use to adjust the alignment of the calibration device 1012. In this example, the first and second adjustable eye axis reference components 6080, 6082 are mounted on a synchronous adjustment mechanism. In this way, the eye axis reference components 6080, 6082 can be adjusted synchronously until the user can see through both pinholes.

The head-axis calibration device 1012 further comprises a calibration device fiducial reference 1013. The calibration device fiducial reference 1013 has a predetermined geometrical relationship with respect to the first axis 6076 and the second axis 6084 of the calibration device 1012. In this example, the calibration device fiducial reference 1013 comprises five motion-capture reflective spheres positioned at different locations around a frame of the head-axis calibration device 1012. The calibration device fiducial reference may comprise three or more reflective markers, a Charuco target, an Aruco marker or any other known fiducial reference that can be used to identify a pose of the calibration device 1012 using the plurality of fixed cameras 1004.

In use, the head-axis calibration device 1012 is aligned to the users head by: (i) positioning the first and second vertical axis face engaging component 6072, 6074 on the corresponding first and second features of the user's face; and (ii) adjusting the first and second eye axis reference components 6080, 6082 until the first and second visual references 6086, 6088 align with the respective eye, e.g. the user can see through both pinholes. Once the head-axis calibration device 1012 is aligned with the user's head, the first axis 6076 of the head-axis calibration device 1012 corresponds to the vertical axis 6078 of the head coordinate system 1017 of the user and the second axis 6084 of the head-axis calibration device 1012 corresponds to the eye axis 6092 of the head coordinate system 1017. As a result, the plurality of fixed cameras 1004 can register a ground truth of the head-coordinate system 1017. Furthermore, as explained further below, if the user is also wearing the motion-capture head module 1010 (see FIG. 7 for example), the mapping operator between the head module coordinate system 1019 and the head coordinate system 1017 can be obtained. The mapping operator can be used to determine the pose of the head-coordinate system 1017 in further images in which the user continues to wear the motion capture head module 1010 in the absence of the calibration device 1012, enabling annotation of the further images to provide training images for the ML head pose detection algorithm.

Determining Head Coordinate System 1017 Using the Head-Axis Calibration Device 1012

Figure 7:
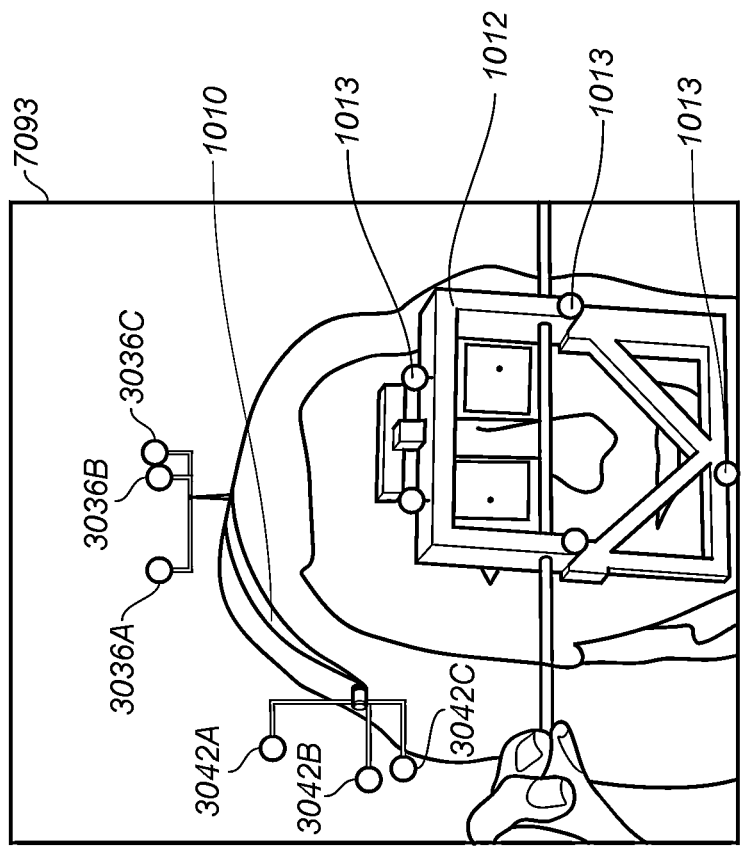
FIG. 7 illustrates an example image of a user wearing the head-axis calibration device of FIG. 6 and the motion-capture head module of FIG. 3.

FIG. 7 illustrates an example image 7093 of a user wearing the head-axis calibration device 1012 of FIG. 6 and the motion-capture head module 1010 of FIG. 3, captured by one of the plurality of cameras 1004. The image has been captured by a NIR camera 1004 under NIR illumination from the plurality of NIR light sources 1006. The reflective markers 3036A, 3036B, 3036C and the further reflective markers 3042A, 3042B, 3042C of the head module 1010 can be seen as bright white circles in the vicinity of the user's head. The calibration device fiducial reference 1013 can be seen as five bright white circles in the vicinity of the calibration device 1012. The image 7093 in combination with another image captured at the same time by a different one of the plurality of fixed cameras 1004 allows calculation of the mapping operator between the head module coordinate system 1019 and the head coordinate system 1017, as described below.

Figure 8:
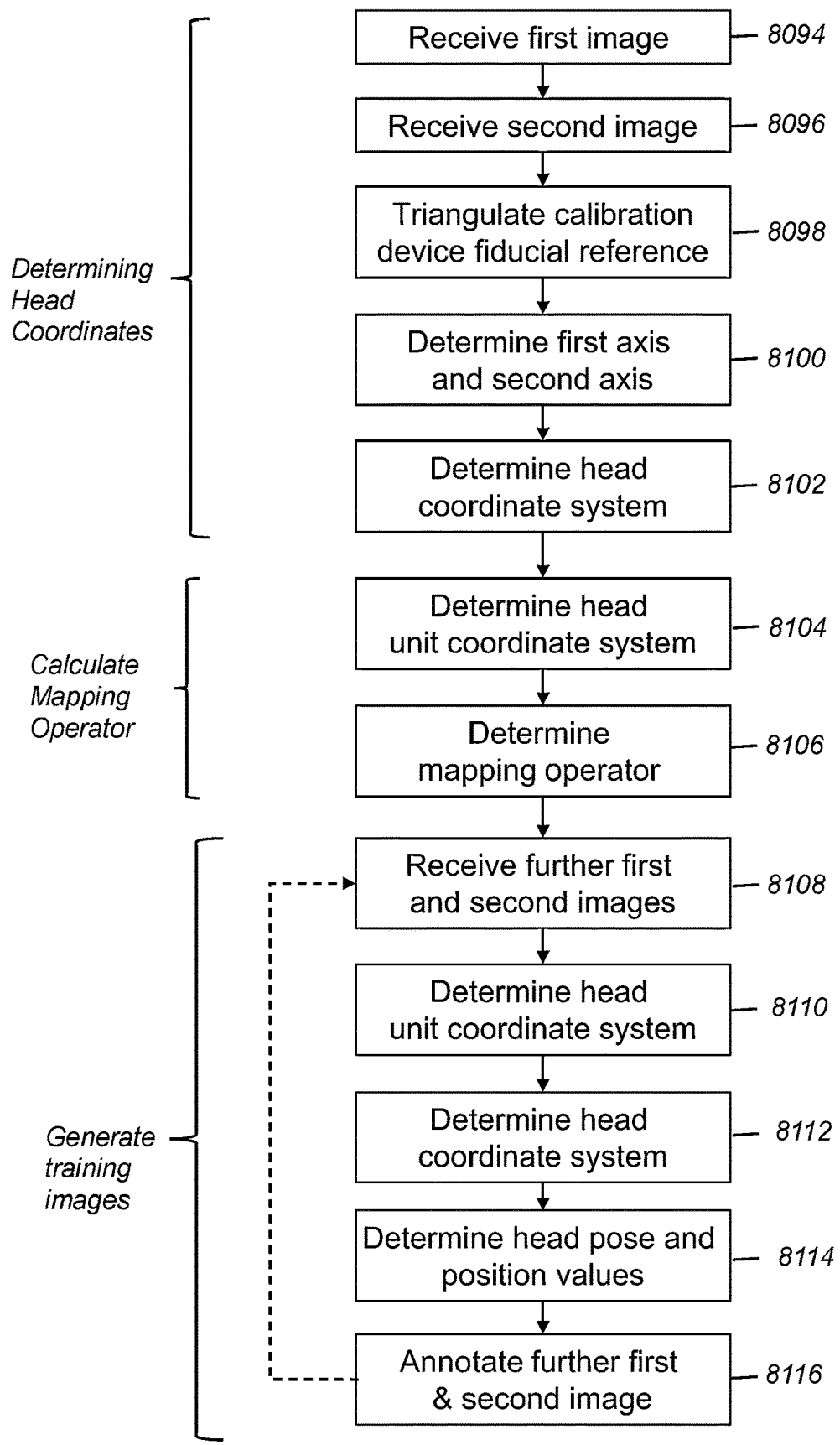
FIG. 8 illustrates a method of determining the head coordinate system, the mapping operator and the head pose in a plurality of further images according to an embodiment of the present disclosure.

FIG. 8 illustrates a method of determining the head coordinate system 1017, the mapping operator and the head pose in a plurality of further images according to an embodiment of the present disclosure. The method will be described with continuing reference to the earlier Figures. The method may be performed as part of steps 2024 and 2030 of FIG. 2.

A first step 8094 of the method comprises receiving a first image, captured by a first camera (of the plurality of fixed cameras 1004), at a first time, of the user with a head-axis calibration device 1012 aligned to their face.

A second step 8096 comprises receiving a second image, captured by a second camera (of the plurality of fixed cameras 1004) at the first time, of the user with the head-axis calibration device 1012 aligned to their face.

The head-axis calibration device 1012 may be the head-axis calibration device 1012 described in relation to FIG. 6. The first time may correspond to the same first time described above in relation to the method of FIG. 5 and the first and second images may correspond to the same first and second images described above in relation to FIG. 5. In other words, the first and second images may comprise the user wearing the motion-capture head module 1010 of FIG. 3 with the head-axis calibration unit 1012 aligned to their face. As also described in relation to FIG. 5, each of the first camera and the second camera have a different known pose in the world coordinate system 1018.

A third step 8098 comprises triangulating a three-dimensional, 3D, pose of the calibration device fiducial reference 1013 in the world coordinate system 1018 based on a two-dimensional, 2D, pose of the calibration device fiducial reference 1013 in both the first image and the second image (and the known pose and angular field of view of the respective camera in the world coordinate system 1018). Step 8098 may use the known methods of back-projection and triangulation described above.

A fourth step 8100 comprises determining the first axis 6076 and the second axis 6084 of the calibration device 1012 in the world coordinate system 1018 based on the 3D pose of the calibration device fiducial reference 1013 in the world coordinate system 1018 and the predetermined geometrical relationship of the calibration fiducial reference 1013 to the first axis 6076 and the second axis 6084.

A fifth step 8102 comprises determining a pose of the head coordinate system 1017 with respect to the world coordinate system 1018 based on the first axis 6076 and the second axis 6084 of the head-axis calibration device 1012. The fifth step 8102 may comprise: determining the vertical axis 6078 of the head coordinate system 1017 as the first axis 6076 of the head-axis calibration device 1012; determining an eye axis 6092 of the head coordinate system 1017 as the second axis 6084 of the calibration device 1012; and determining a third axis of the head coordinate system 1017 as an axis perpendicular to both the vertical axis 6078 and the eye axis 6092. The fifth step 8102 may further comprise determining a position of an origin of the head-axis coordinate system 1017. The position of the origin may be determined as a 3D position at a predetermined distance behind the calibration device 1012, along the third axis of the head coordinate system 1017. The origin may correspond to a position equidistant between centres of the user's eyes. Determining the origin of the head coordinate system at this location can define a gaze origin which may be required for any eye tracking processes being performed in addition to head pose tracking.

The first to fifth steps 8094-8102 provide a ground truth value of the pose of the head-axis coordinate system 1017 in the world coordinate system 1018. If the first and second image also include the user wearing the motion capture head module 1010, then sixth and seventh steps 8104, 8106 of the method can determine the mapping operator for transforming the head module coordinate system 1019 to the head coordinate system 1017. Eighth to twelfth steps 8108-8116 can then receive and process further images with the user wearing the head module 1010 in the absence of the calibration device 1012 to provide annotated images for training a ML head pose detection algorithm.

For the following steps 8104-8116, it is assumed that the first and second image include the user wearing a motion-capture head module 1010 with a head module fiducial reference 1011 (such as the head modules 1010 described above).

The sixth step 8104 comprises determining a pose of the head module coordinate system 1019 with respect to the world coordinate system 1018 based on the 2D pose of the head module fiducial reference 1011 in the first image and the second image (and the known pose (and angular field of view) of the respective camera in the world coordinate system 1018). Determining the pose of the head module coordinate system 1019 may be performed using back projection and triangulation of the head module fiducial reference as described above. The head module coordinate system 1019 may have a predetermined relationship with the head module fiducial reference 1011. In some examples, the pose of the head module coordinate system 1019 may simply be defined as the pose of the head module fiducial reference 1011. In this way, tracking of the pose of the head module fiducial reference 1011 provides tracking of the pose of the head module coordinate system 1019 (and the user's head).

The seventh step 8106 comprises determining a mapping operator for transforming the head module coordinate system 1019 to the head coordinate system 1017, based on the pose of the head module coordinate system 1019, and the pose of the head coordinate system 1017, with respect to the world coordinate system at the first time. The mapping operator defines a fixed transformation from the head module coordinate system 1019 to the head coordinate system 1017 that can be used for determining the pose of the head-coordinate system 1017 for further images in which the calibration device 1012 is absent.

The eighth step 8108 comprises receiving, a further first image captured by the first camera at a second time and a further second image captured by the second camera at the second time, of the user wearing the motion-capture head module 1010 in the absence of the calibration device 1012. The further first image and the further second image may correspond to one of the further first and second images described above in relation to FIG. 5.

The ninth step 8110 comprises determining a pose of the head module coordinate system 1019 in the world coordinate system at the second time based on the 2D pose of the head module fiducial reference 1011 in the further first image and the further second image. The ninth step 8110 may be performed in the same way as the sixth step 8104.

The tenth step 8112 comprises determining a pose of the head coordinate system 1017 with respect to the world coordinate system 1018 at the second time based on the pose of the head module coordinate system 1019 with respect to the world coordinate system 1018 at the second time, and the mapping operator (e.g. by matrix multiplication of the mapping operator and the head module coordinate system 1019 with respect to the world coordinate system 1018).

The eleventh step 8114 may comprise determining a head pose value of the user at the second time, for each of the further first image and the further second image, based on the pose of the head module coordinate system 1019 with respect to the world coordinate system 1018 at the second time and the pose of the respective first camera or second camera in the world coordinate system 1018.

The twelfth step 8116 comprises generating ML training images by annotating the first further image and the second further image with the respective head pose value.

The method may repeat steps 8108 to 8106 to generate further training images. Alternatively, step 8108 may comprise receiving a plurality of further first and second images and steps 8110 to 8116 may process the plurality accordingly.

The method of claim 8 can provide a simple approach to performing steps 2024, 2026 and 2030 of FIG. 2.

Determining the Eye Axis Without a Calibration Device 1012

Figure 9:
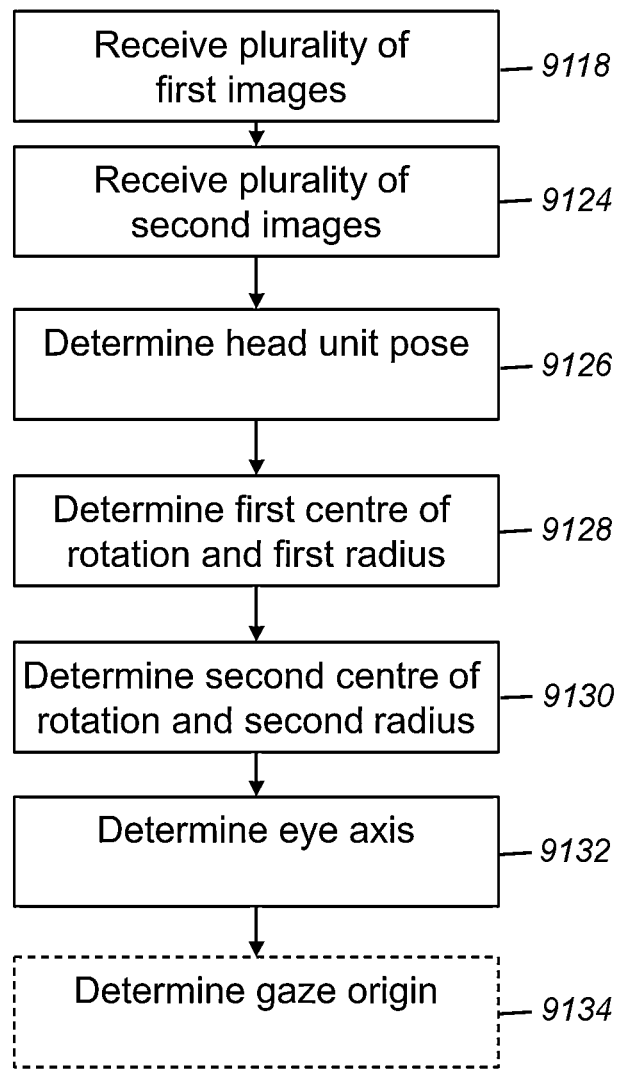
FIG. 9 illustrates a method of determining the eye axis of the head coordinate system without requiring a head-axis calibration device, according to an embodiment of the present disclosure.

FIG. 9 illustrates a method of determining the eye axis 6084 of the head coordinate system 1017 without requiring a head-axis calibration device 1012, according to an embodiment of the present disclosure. The method of FIG. 9 may form part of steps 2026 and 2028 of FIG. 2.

Figure 10:
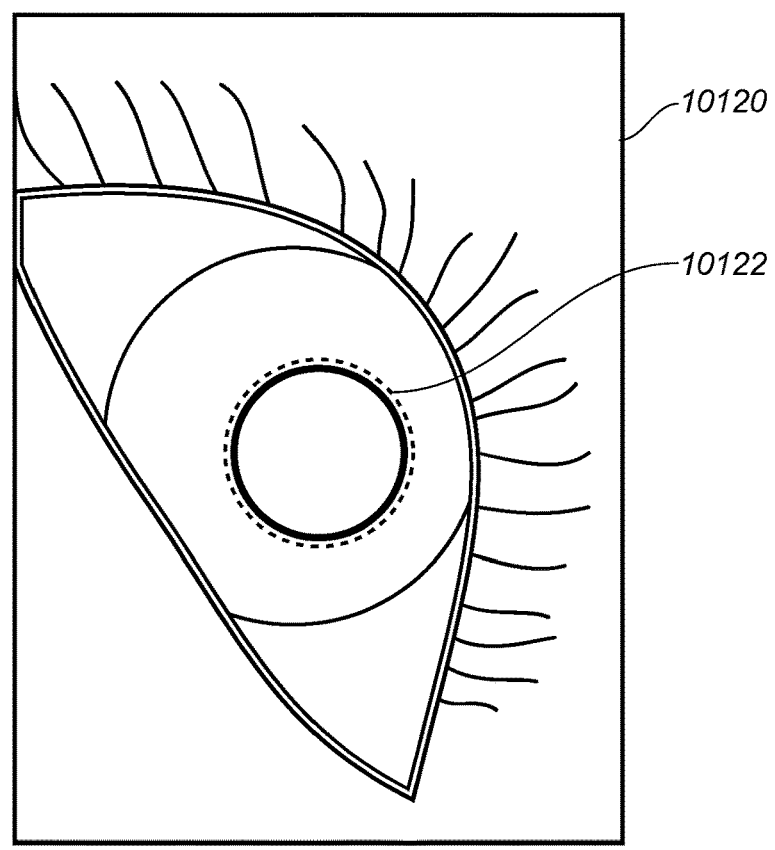
FIG. 10 illustrates a portion of an example first image having a first annotated pupil position.

A first step 9118 of the method comprises receiving a plurality of first images, captured by a first camera of the plurality of fixed cameras 1004 at a series of time points, of the user wearing a motion-capture head module 1010 comprising a head module fiducial reference 1011 and looking at one of a plurality of reference points with known positions in the world coordinate system 1018. For example, the images may be captured following instructing the user to look at one of the known reference points, e.g., "look at target X fixed above the lens of camera X". Each of the plurality of first images also comprise a first annotated pupil position for a first eye of the user and a second annotated pupil position for a second eye of the user. FIG. 10 illustrates a portion of an example first image 10120 having a first annotated pupil position 10122.

The pupil position may be annotated manually, by a user, or automatically, using a pupil detection algorithm, to provide the first and second annotated pupil positions.

A second step 9124 comprises receiving a plurality of second images of the user, captured by a second camera of the plurality of fixed cameras 1004 at the series of time points, of the user wearing the head module 1010 and looking at the one reference point. As in earlier examples, the first camera and the second camera have each have a known pose in the world coordinate system 1018. The first and second cameras may correspond to the first and second cameras described in relation to the methods of FIG. 5 and/or FIG. 8. The plurality of first and second images may correspond to the further first and second images described in relation to FIG. 5.

The first step 9118 and the second step 9124 may form step 2026 of FIG. 2.

The plurality of first images and the plurality of second images captured at the series of time points define corresponding pairs of first and second images captured at the same time point of the series of time points.

A third step 9126 comprises, for each pair of first and second images captured at the same time point, determining a pose of the head module coordinate system 1019 with respect to the world coordinate system 1018, by triangulating the pose of the head module fiducial reference 1011 in the world coordinate system 1018 based on the 2D pose of the head module fiducial reference 1011 in the first image and the second image (and the known pose (and angular field of view) of the respective camera in the world coordinate system 1018). Determining the head module coordinate system 1019 for each pair of images may be performed in the same manner as described above (triangulation and back-projection) for steps 8104 and 8110 of the method of FIG. 8.

A fourth step 9128 comprises determining a first centre of rotation of the first eye and a first radius of the first eye based on: (i) the first annotated pupil position for each first image; (ii) the pose of the head module coordinate system 1019 with respect to the world coordinate system 1018 for each first image; and (iii) the known position of the reference point in the world coordinate system 1018 for each first image.

Determining the first centre of rotation and the first radius may comprise using an optimisation algorithm to reduce a total error between a camera ray from the camera position to the annotated pupil position and a gaze ray from the first centre of rotation towards the known position of the reference point, over the plurality of first images. The optimisation may be performed in the head module coordinate system 1019.

Figure 11:
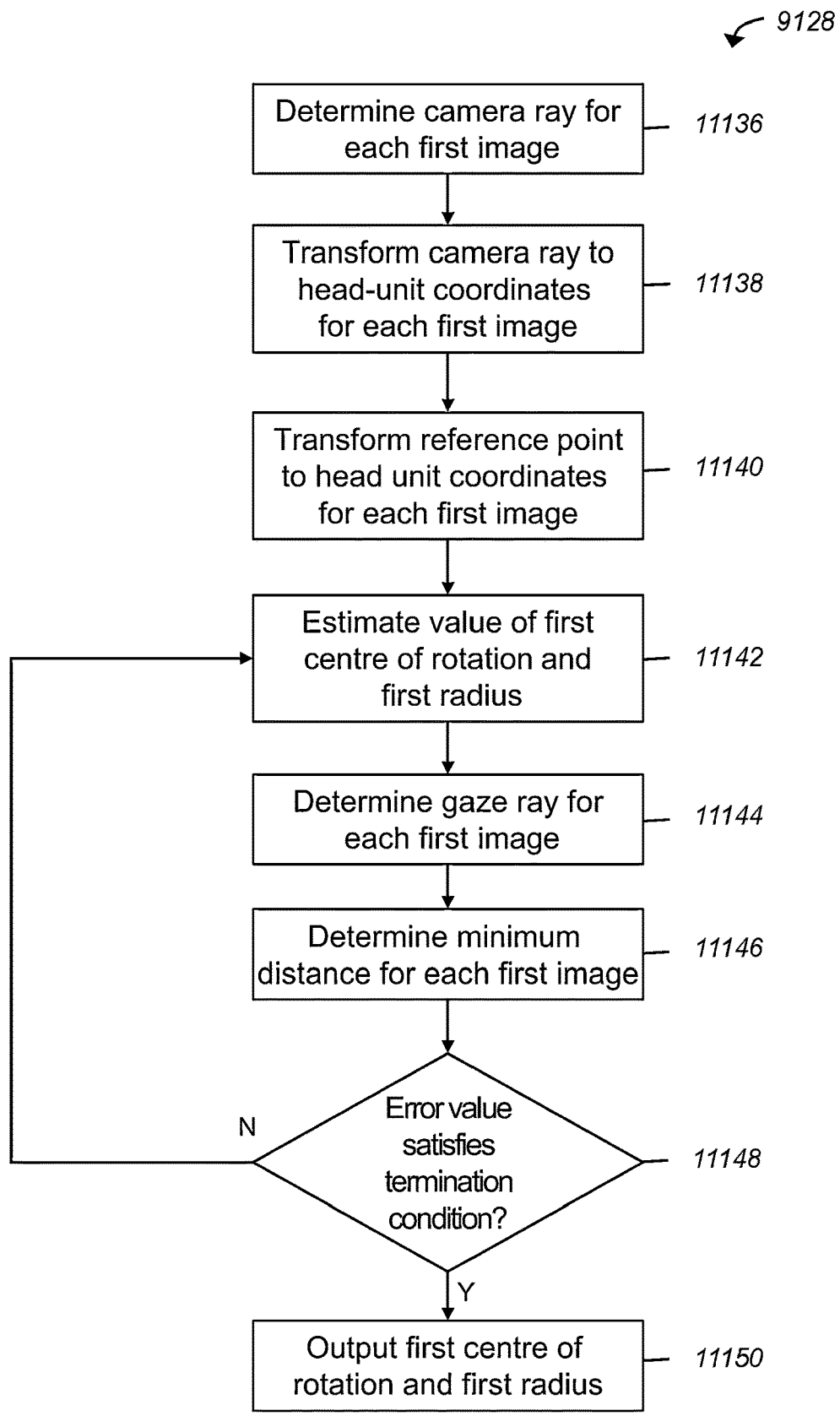
FIG. 11 illustrates an example optimisation method for determining a first centre of rotation and a first radius for a first eye, according to an embodiment of the present disclosure.

FIG. 11 illustrates an example optimisation method 9128 for determining the first centre of rotation and the first radius, according to an embodiment of the present disclosure.

Figure 12:
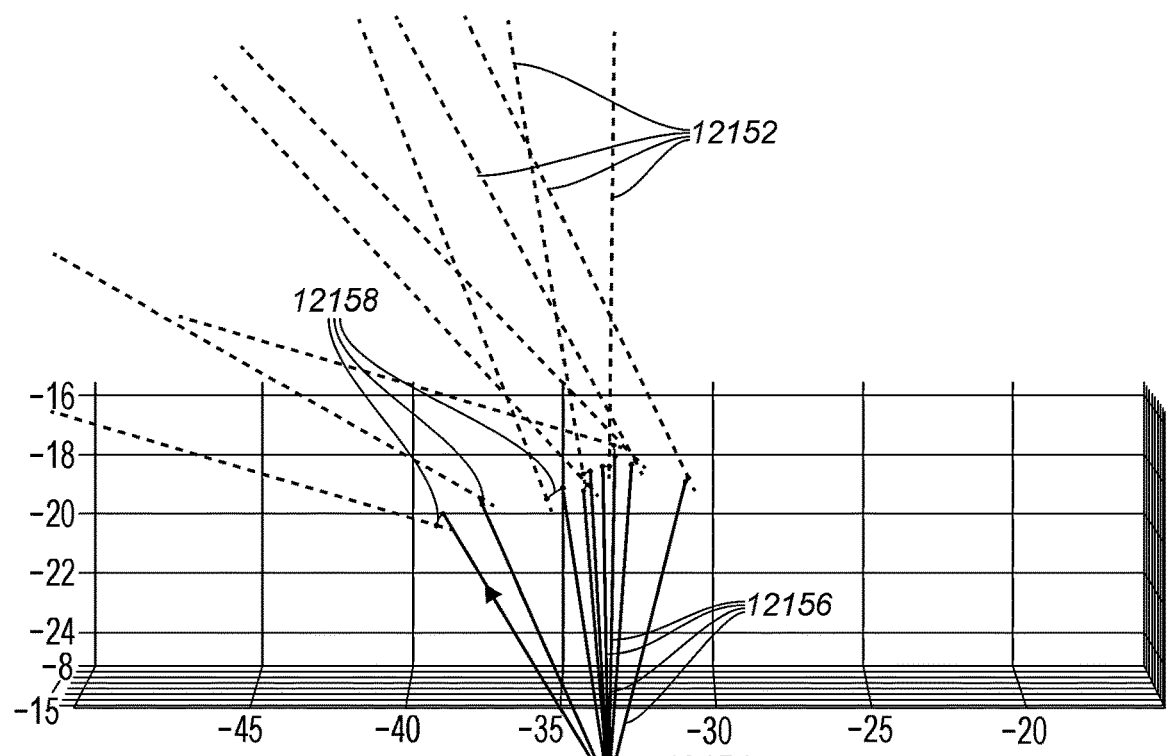
FIG. 12 illustrates explanatory geometry in the head module coordinate system for understanding the method of FIG. 11.

FIG. 12 illustrates explanatory geometry in the head module coordinate system 1019 for understanding the method of FIG. 11. Reference will be made to FIG. 12 in the following description of the method of FIG. 11.

A first step 11136 comprises, for each first image, determining a camera ray 12152 in the world coordinate system 1018 by back-projecting from a position of the first camera through the first annotated pupil position in the first image. As outlined above, back projection is a known technique to define a vector from a position of the camera through the feature in the 2D image. The direction of the vector is defined by an axis or orientation of the camera, the angular field of view of the camera and the 2D pixel location of the feature. The 2D pixel location and the angular field of view define an angular deviation of the feature from the axis of the camera. Therefore, in this example, the camera ray 12152 may be determined using the known pose of the first camera in the world coordinate system 1018, an angular field of view of the first camera and a 2D pixel location of the first annotated pupil position in the first image. In a similar way to that described above, the camera ray 12152 may first be determined in a first camera coordinate system of the first camera by performing the back-projection in the first camera coordinate system, before transforming the camera ray 12152 to the world coordinate system 1018 based on the pose of the respective camera in the world coordinate system 1018.

A second step 11138 comprises, for each first image, transforming the camera ray 12152 to the head module coordinate system 1019 using the pose of the head module coordinate system 1019 with respect to the world coordinate system 1018, calculated for the corresponding image pair (in step 9126). FIG. 12 illustrates the resulting plurality of camera rays 12152 (one for each first image) in the head module coordinate system 1019. In the frame of reference of the head module coordinate system 1019, the position of the first camera varies as the user moves their head and the position of the pupil centre moves as the user moves their eyes. As a result, different camera rays extending between different positions of the pupil centre and the first camera position can be seen in FIG. 12 as the user moves both their head and eyes to look at the different reference points.

A third step 11140 comprises, for each first image, determining a position of the reference point, associated with the first image, in the head module coordinate system 1019 using the known position of the reference point in the world coordinate system 1018 and the pose of the head module coordinate system 1019 with respect to the world coordinate system 1018.

Fourth to seventh steps 11142 be 11148 may be performed iteratively to provide an optimisation of the first centre of rotation and the first radius. A fourth step 11142 comprises setting a value of the first centre of rotation 12154 and a value of the first radius. If the fourth step 11142 is being performed for the first time, initial values of the first centre of rotation 12154 and first radius may be set. The initial value of the first centre of rotation may be set based on a rough estimation, for example estimated based on an assumption that the user is gazing straight at the first camera and using the initial value of the first radius. The initial value of the first radius may be set or estimated based on average population values. If the fourth step 11142 is being performed during an iterative step, the values of the first radius and first centre of rotation 12154 may be set based on one or more previously estimated values of the first centre of rotation and first radius. As can be seen in FIG. 12, the first centre of rotation 12154 in the head coordinate system 1019 remains stationary regardless of motion of the user's head or eyes, as the user looks at the different reference points.

A fifth step 11144 comprises, for each first image, determining a gaze ray 12156 extending from the first centre of rotation towards the known position of the reference point, associated with the first image, in the head coordinate system 1019. The gaze ray 12156 starts from the first centre of rotation 12154 and extends to a distal end with a length equal to the first radius.

A sixth step 11146 comprises determining, for each first image and corresponding camera ray 12152 and gaze ray 12156, a first minimum distance 12158 between the distal end of the gaze ray 12156 and the camera ray 12152. As the camera ray 12152 is effectively an infinite line (calculation from back-projection), the first minimum distance 12158 can be calculated using standard geometry for determining the shortest distance from a point to a line. A first error value may comprise a sum of the first minimum distances 12158 for the plurality of first images.

A seventh step 1148 may determine if the first error value satisfies a termination condition. If the first error value satisfies the termination condition, the method proceeds to step 11150 and outputs the first centre of rotation 12154 and the first radius. If the first error value does not satisfy the termination condition, the method returns to the fourth step 11142 and adjusts the value of the first centre of rotation 12154 and the first radius. The method can then repeat steps 11144 and 11146 and calculate new gaze rays 12156, first minimum distances 12158 and first error value until the termination condition is satisfied. In this way, the method 9128 provides an optimisation approach to determining the values of the first centre of rotation 12154 and the first radius.

The optimisation may use any known optimisation approach such as hill climbing, gradient descent and Nelder-Mead algorithms. The first error value as a function of the first radius and first centre of rotation 12154 can be defined based on the known camera ray 12152 and equations for the gaze ray 12156 and first minimum distance 12158, to define an objective function. The fourth step 11142 may set iterative values of the first centre of rotation 12154 and first radius according to the rules of the chosen optimisation algorithm, e.g., defining a simplex based on one or more previous first error values and one or more previous values of the first centre of rotation 12154 and the first radius. The termination condition may comprise known termination conditions for optimisation routines, for example, reaching a maximum number of iterations, the first error value (objective function value) falling below a threshold, a rate of change, or gradient, of the first error value falling below a threshold etc.

Iteration of the fourth to seventh steps 11142 to 11148 provides iterative adjustment of the values of the first centre of rotation 12154 and the first radius, and recalculation of the gaze ray 11156 for each first image to select values of the first centre of rotation 12154 and the first radius that reduce the first error value.

Returning to FIG. 9, a fifth step 9130 comprises determining a second centre of rotation of the second eye and a second radius of the second eye based on: (i) the second annotated pupil position for each first image; (ii) the pose of the head module coordinate system 1019 with respect to the world coordinate system 1018 for each first image; and (iii) the known position of the reference point in the world coordinate system 1018 for each first image.

The fifth step 9130 may be performed in substantially the same way as described above for the fourth step 9128 and FIG. 11. In particular, determining the second centre of rotation and the second radius of the second eye may comprise:
- determining, for each of the first images, a second camera ray in the world coordinate system 1018 by back-projecting from a position of the first camera through the second annotated pupil position in the first image (using the known pose of the first camera in the world coordinate system 1018, the field of view of the first camera and a 2D pixel location of the second annotated pupil position in the first image);
- transforming the second camera ray to the head module coordinate system 1019 using the pose of the head module coordinate system 1019 with respect to the world coordinate system 1018;
- determining a second gaze ray extending from the second centre of rotation towards the position of the reference point in the head module coordinate system 1019 (calculated in step 11140), with a length equal to the second radius;
- determining a second minimum distance between the second camera ray and a distal end of the second gaze ray; and
- iteratively adjusting the values of the second centre of rotation and the second radius and recalculating the second gaze ray for each first image to select values of the second centre of rotation and the second radius that reduce a second error value, wherein the second error value is based on the value of the second minimum distance for each first image.

In the same way as described above for the first camera ray 12152, the second camera ray may first be determined in the first camera coordinate system using back-projection before being transformed to the world coordinate system 1018.

A sixth step 9132 comprises determining an eye axis as a vector between the first centre of rotation 12154 and the second centre of rotation. The first and second centres of rotation and the eye axis may be determined with respect to the head module coordinate system 1019.

An optional seventh step 9134 comprises determining an origin of the head coordinate system 1017 as a point equidistant between the first centre of rotation 12154 and the second centre of rotation. The origin of the head coordinate system 1017 can be useful for determining the full head coordinate system 1017 as described below.

In some examples, the second plurality of images (or further pluralities of images from other cameras of the plurality of cameras) may also be used to estimate values of the first and second centres of rotation and first and second radii. The estimated values from each plurality of images may then be averaged to provide more accurate values.

In some examples, the plurality of first and second images may comprise a user wearing spectacles. Including users wearing spectacles can provide a more rich and comprehensive set of training data for training the ML head pose algorithm.

Figure 13:
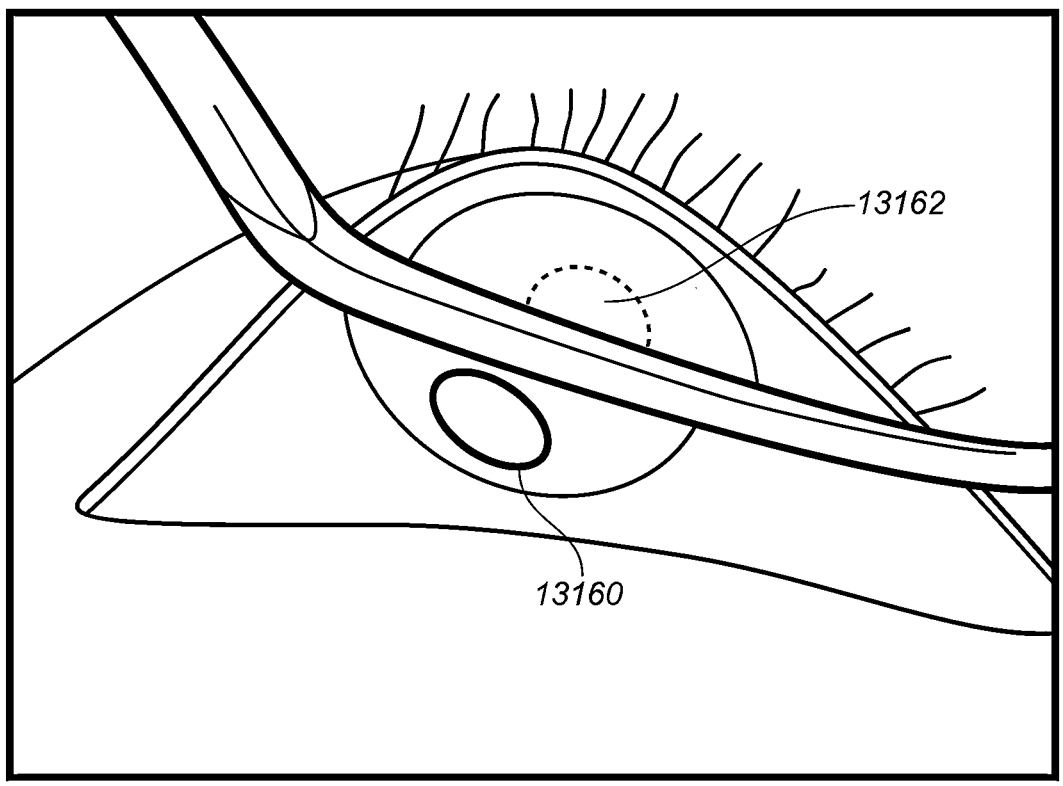
FIG. 13 illustrates a portion of an image captured of a user wearing spectacles.

FIG. 13 illustrates a portion of an image captured of a user wearing spectacles. As illustrated, the camera images an apparent pupil position 13160 differing from a real pupil position 13162 due to the refraction of the spectacles. The annotated first and second pupil positions may correspond to the apparent pupil positions.

Figure 14:
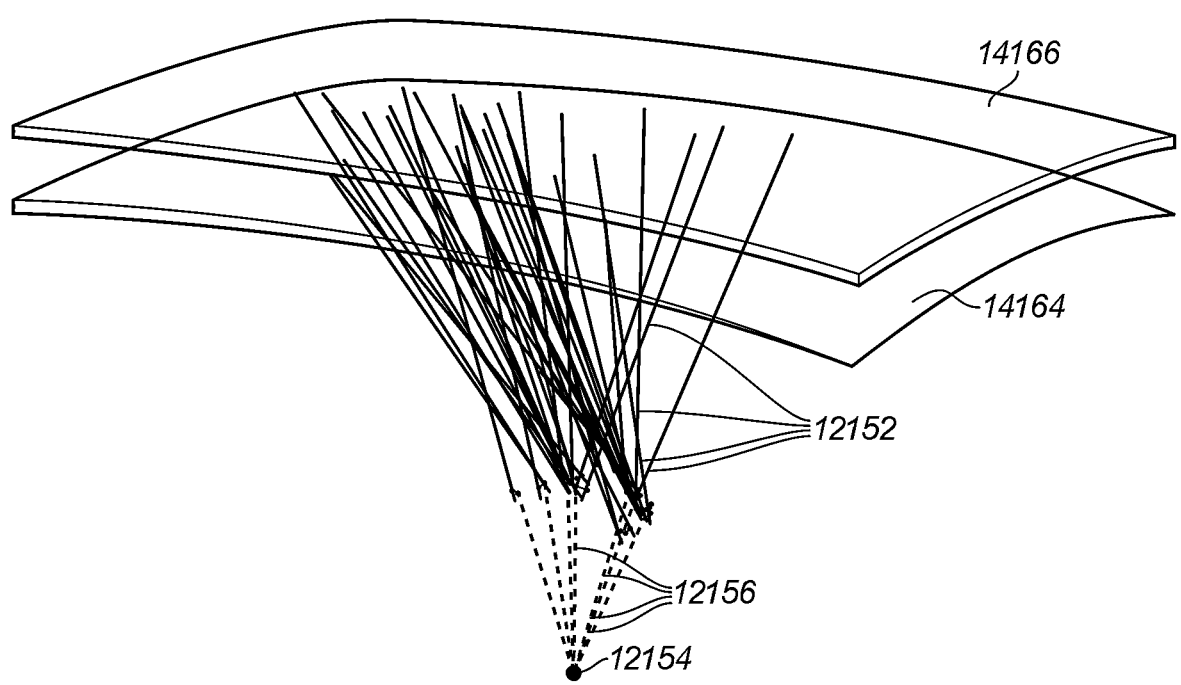
FIG. 14 illustrates explanatory geometry in the head module coordinate system for a user wearing spectacles.

The presence of spectacles changes steps 9128 and 9130 of the method of FIG. 9 from being a two-parameter optimisation problem to a four-parameter optimisation problem. In particular, a two-surface lens is included in the model of each eye with unknown position and curvature (optical power). This is illustrated in FIG. 14 by a first lens surface 14164 and a second lens surface 14166 for the first eye. The method for determining the first and second centres of rotation and radii differs from the spectacle-free methods described above in relation to FIG. 11 as follows:
- First and second steps 11136, 11138 are performed inside the iteration loop (i.e. between fourth to seventh steps 11142 and 11148). In other words, new first and second camera rays are calculated for every iteration loop;
- The first and second camera rays are calculated by compensating for refraction through the first and second lens surfaces 14164, 14166 of the lens for the respective first or second eye; and
- The fourth step 11142 further comprises setting values for the position and power of the lens for the respective first or second eye.

Determining the Remaining Axes of the Head Coordinate System 1017

Figure 15:
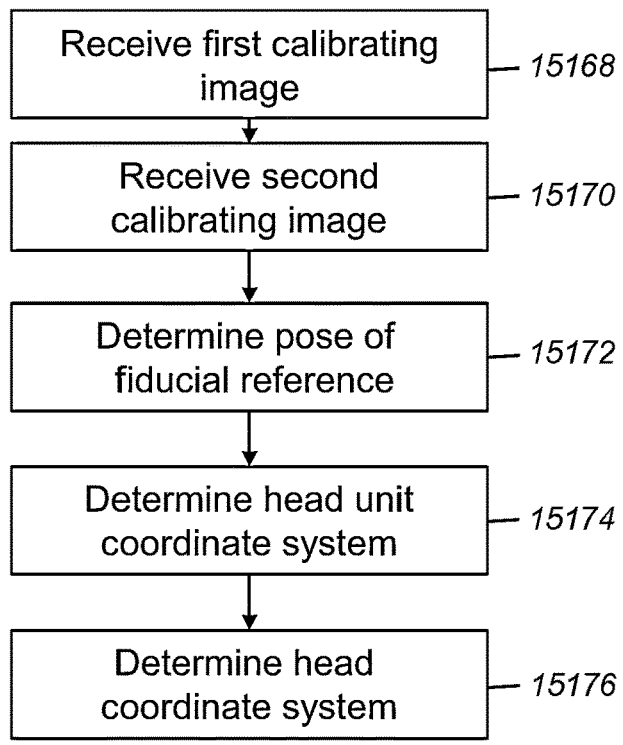
FIG. 15 illustrates a method of determining the remaining axes of the head coordinate system according to an embodiment of the present disclosure.

FIG. 15 illustrates a method of determining the remaining axes of the head coordinate system that may follow the method of FIG. 9. The method will be illustrated with continuing reference to the earlier Figures.

Figure 16:
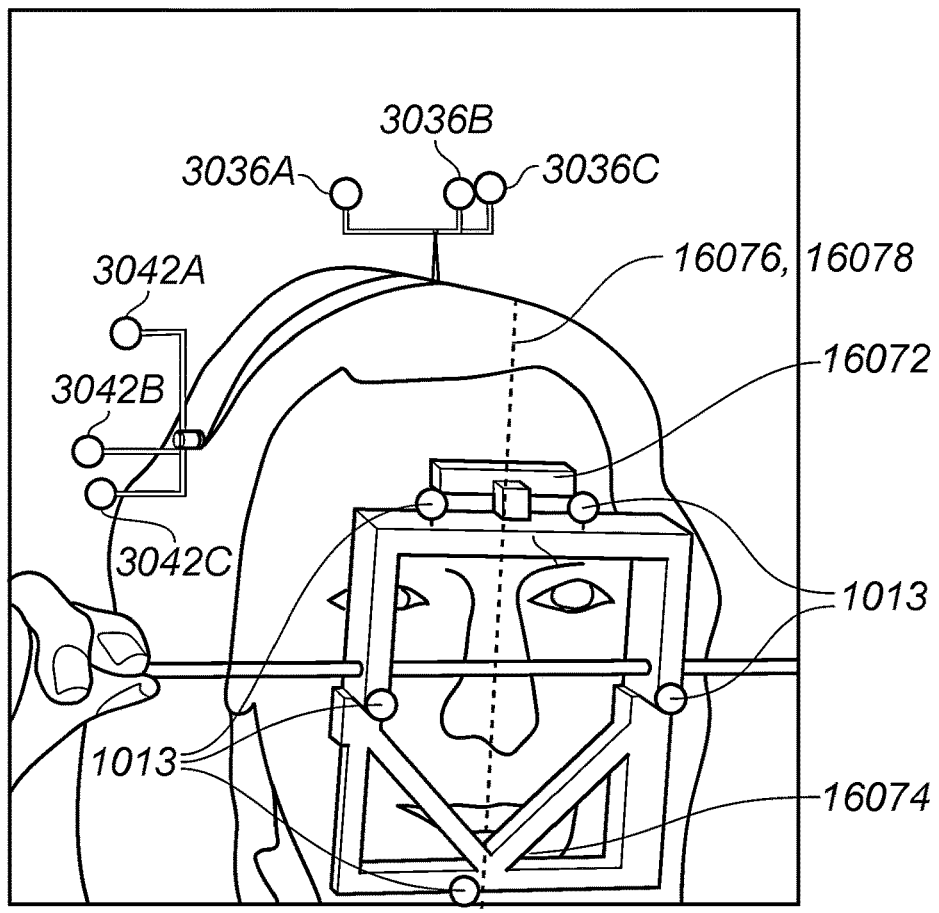
FIG. 16 illustrates a captured image of a user wearing the head-axis calibration device of FIG. 6 and the motion-capture head module of FIG. 3.

A first step 15168 comprises receiving a calibrating first image, captured by the first camera at a calibration time, of the user wearing the motion capture head module 1010 and with a single-axis calibration device 1012 aligned to their face. The single-axis calibration device may be for determining a ground truth for the vertical axis of the head coordinate system 1017. FIG. 16 illustrates a captured image of a user wearing an example single-axis calibration device 1012. In this example, the single-axis calibration device 1012 may comprise vertical axis face engaging components 16072, 16074, aligned along a first axis 16076 of the calibration device 1012. The vertical axis face engaging components 16072, 16074 may include a first vertical axis face engaging component 16072 for engaging a first feature along a vertical axis of the user's face (in the example the centre of the user's forehead); and a second vertical axis face engaging component 16074 for engaging a second feature along the vertical axis of the user's face (in this example the user's chin). The single axis calibration device further includes a calibration device fiducial reference 1013 having a predetermined fixed geometrical relationship with the first axis 16076 of the calibration device 1012. The single-axis calibration device may be the same as the two-axis calibration device of FIG. 6 with the exception that the single-axis calibration device 1012 does not include any eye-axis reference components.

A second step 15170 comprises receiving a calibrating second image, captured by the second camera at the calibration time, of the user wearing the motion capture head module 1010 and with the single-axis calibration device 1012 aligned to their face.

A third step 15172 comprises determining a 3D pose of the calibration device fiducial reference 1013 in the world coordinate system 1018 based on a 2D pose of the calibration device fiducial reference 1013 in the first calibrating image and the second calibrating image (and the known pose (and angular field of view) of the respective camera in the world coordinate system 1018). The 3D pose of the calibration device fiducial reference 1013 may be determined using back-projection as described above.

A fourth step 15174 comprises determining the first axis 16076 of the single-axis calibration device 1012 in the world coordinate system 1018 based on the 3D pose of the calibration device fiducial reference 1013 in the world coordinate system 1018.

A fifth step 15176 comprises determining a pose of the head module coordinate system 1019 with respect to the world coordinate system 1018 for the first and second calibrating images, by triangulating the pose of the head module fiducial reference 1011 in the world coordinate system 1018 based on the 2D pose of the head module fiducial reference 1011 in the first calibrating image and the second calibrating image (and the known pose and angular field of view of the respective camera in the world coordinate system 1018).

A sixth step 15178 comprises determining the head coordinate system 1017 based on the first axis 16076 of the single-axis calibration device 1012 in the world coordinate system 1018, the eye axis (determined in step 132 of FIG. 9) and the pose of the head module coordinate system 1019 with respect to the world coordinate system 1018 for the first and second calibrating images. It will be appreciated that the estimated values for the first centre of rotation, the second centre of rotation and the eye axis (calculated in steps 9128 to 9132 of FIG. 9) may be provided with respect to the head module coordinate system 1019. Therefore, determining the head coordinate system 1017 may comprise: (i) transforming the eye-axis (including the origin) from the head module coordinate system 1019 to the world coordinate system 1018 using the pose of the head module coordinate system 1019 in the world coordinate system 1018 for the first and second calibrating images, to provide the head axis coordinate system 1017 with respect to the world coordinate system 1018; or (ii) transforming the first axis 16076 of the single-axis calibration device 1012 to the head module coordinate system 1019 using the pose of the head module coordinate system 1019 in the world coordinate system 1018 for the first and second calibrating images, to provide the head axis coordinate system 1017 with respect to the head module coordinate system 1019. Determining the head coordinate system 1017 with respect to the head module coordinate system 1019 advantageously defines the mapping operator. Regardless of the chosen reference coordinate system, the method may comprise determining a third axis of the head coordinate system 1017 as an axis perpendicular to the eye axis and the first axis 16076 and extending from the origin of the head coordinate system 1017. The first axis 16076 of the single axis calibration device 1012 may be aligned with the vertical axis 16078 of the head coordinate system 1017.

Completion of the sixth step 15178 provides the same mapping operator as defined at the seventh step 8106 of the method of FIG. 8. The method of FIGS. 9 and 15 can advantageously provide a more accurate determination of the head coordinate system 1017 and resulting mapping operator and ground truth reference because the origin of the head coordinate system is accurately determined as the position equidistant between the first and second centres of rotation. The method of FIG. 15 may be followed by seventh to eleventh steps (not illustrated) identical to the eighth to twelfth steps of the method of FIG. 8, described above. Detailed description of the steps is not repeated here for brevity.

Camera—Screen Relative Pose Calibration

Figure 17:
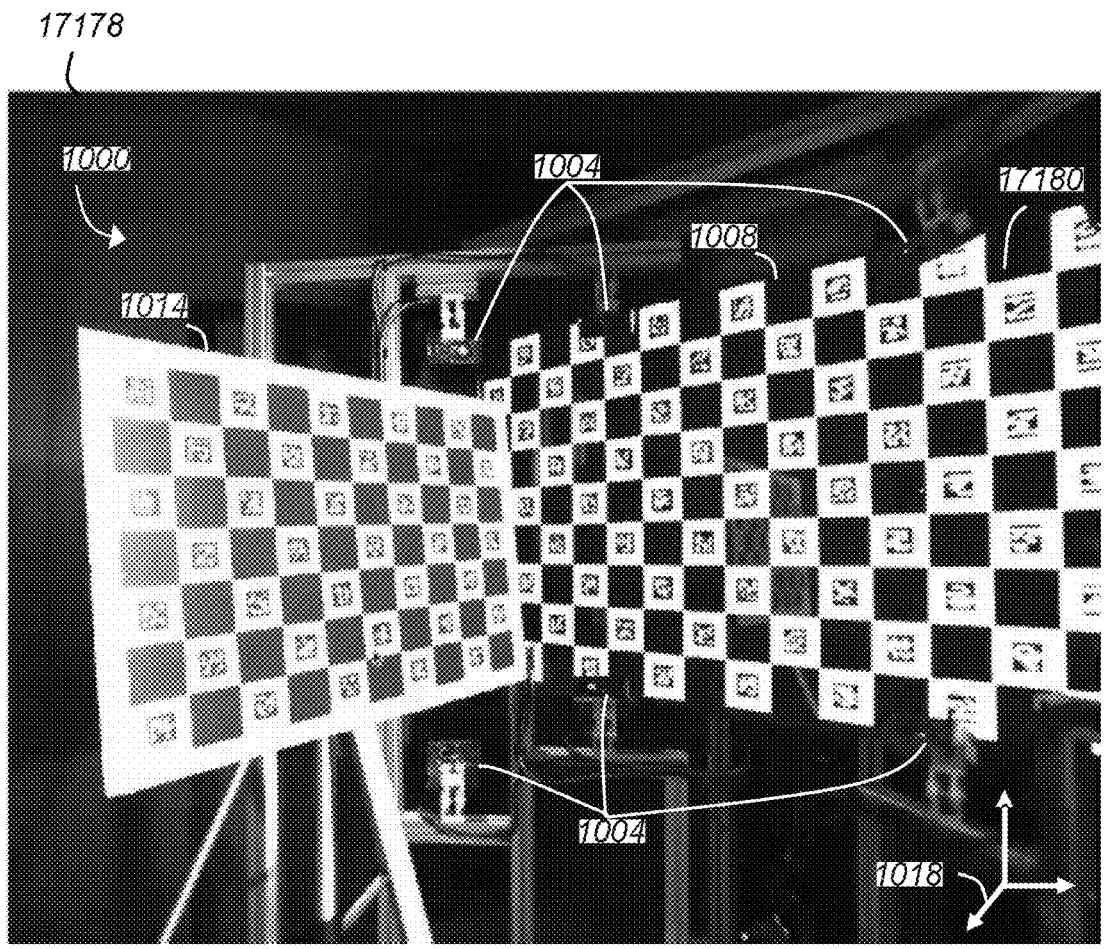
FIG. 17 illustrates an example image captured by a mobile camera for the calibration of a position of the screen in relation to one or more fixed cameras.

FIG. 17 illustrates an example image 17178 captured by a mobile camera 1005 (not shown) of a setup of the system 1000 during the second step 2022 of the method of FIG. 2 of calibrating a position of the screen 1008 in relation to the plurality of fixed cameras 1004.

In this example, the plurality of fixed cameras 1004 comprises three fixed cameras positioned towards a top of the screen 1008 and three fixed cameras positioned towards a bottom of the screen. Each camera 1004 has a different known pose in the world coordinate system 1018 (determined in the first step 2020 of the method of FIG. 2) and is arranged to capture images of a user positioned at the user location (not illustrated). In this example, each camera 1004 points away from the screen 1008. As a result, the cameras 1004 cannot capture an image of the screen 1008 to calibrate the screen's relative position/pose in the world coordinate system 1018. Furthermore, the screen 1008 operates at visible wavelengths such that it can be seen by the user. In many examples, near infra-red (NIR) cameras 1004 and illuminators 1006 are used for eye tracking applications as the eye does not sense these wavelengths. Such NIR cameras 1004 would be unable to image the visible screen 1008.

In order to enable calibration of the pose of the screen 1008 in the world coordinate system 1018 (i.e., relative to the cameras 1004), a screen position reference 1014 (also referred to as a physical fiducial reference 1014) is used in conjunction with a virtual fiducial reference 17180, displayed on the screen 1008, and a mobile camera 1005 (which captured the image 17178). The screen position reference 1014 is positioned in a field of view of at least one of the plurality of fixed cameras 1004.

The screen position reference 1014 is a physical fiducial reference with a plurality of features and known dimensions (both external dimensions and feature dimensions) such that a camera can determine a distance and pose of the screen position reference 1014 with respect to its local camera coordinate system. The virtual reference 17180 is a virtual fiducial reference also having a plurality of features and known dimensions that enable a camera to determine a distance and pose. The virtual fiducial reference 17180 is displayed at a predetermined position on the screen 1008. In this example, both the screen position reference 1014 and the virtual reference 17180 comprise Aruco markers, specifically Charuco targets (Aruco markers arranged in a chessboard pattern).

Figure 18:
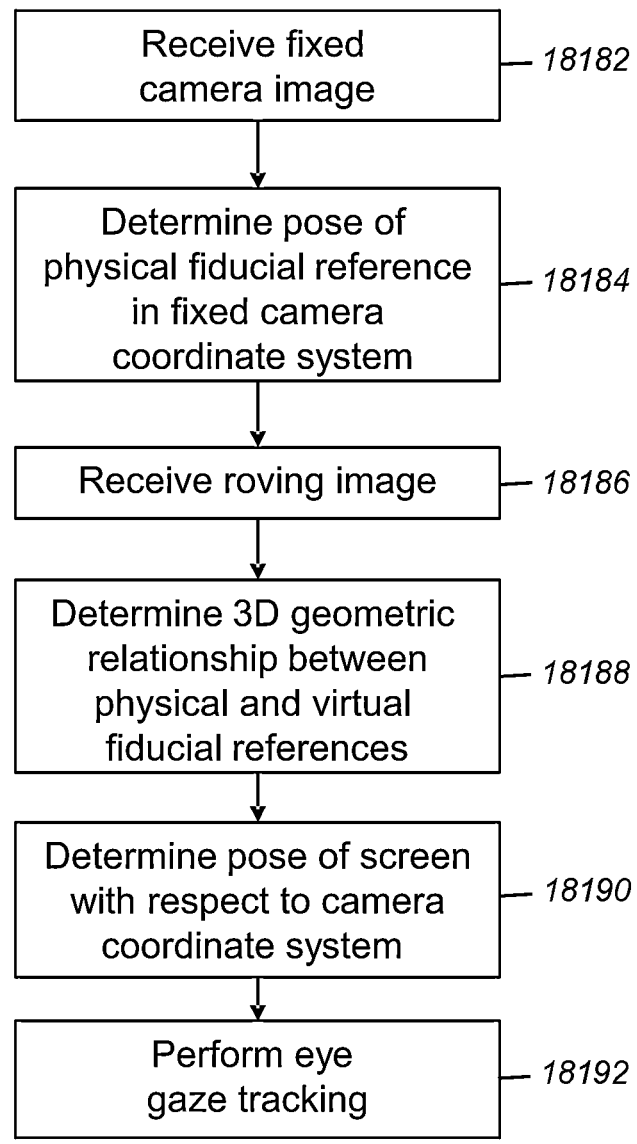
FIG. 18 illustrates a method for determining a pose of a fixed screen, with respect to one or more fixed cameras, for an eye tracking operation according to an embodiment of the present disclosure.

FIG. 18 illustrates a method for determining a pose of a fixed screen 1008 with respect to one or more fixed cameras 1004 for an eye tracking operation according to an embodiment of the present disclosure. The method will be described with continuing reference to FIGS. 1 and 17.

A first step 18182 comprises receiving a fixed camera image from at least one of the one or more fixed cameras 1004, each fixed camera image comprising a physical fiducial reference 1014.

A second step 18184 comprises determining a 3D pose of the physical fiducial reference 1014 in a world coordinate system 1018 based on the dimensions and pose of the physical fiducial reference 1014 in each fixed camera image. The second step 18184 may comprise comparing the dimensions of the physical fiducial reference 1014 in the fixed camera image to the known dimensions of the physical fiducial reference 1014 to determine the 3D pose of the physical fiducial reference in the world coordinate system 1018. For example, the second step 18184 may comprise comparing the outer dimensions in the image to the known outer dimensions of the physical fiducial reference 1014 to determine a coarse distance using a known angular field of view of the camera 1004. The second step 18184 may comprise comparing the features and their dimensions in the image to the known features and their dimensions to determine an orientation of the physical fiducial reference 1014 and refine the exact 3D pose in the world coordinate system 1018. Determination of a pose of a physical fiducial reference, such as an Aruco marker, in a world coordinate system 1018 is a known technique that will not be detailed further here.

The world coordinate system 1018 may comprise a local camera coordinate system of one of the fixed cameras 1004. In this example, the world coordinate system 1018 comprises the world coordinate system 1018 in which each camera 1004 has a known different pose. Therefore, the second step 18184 may comprise: (i) determining the 3D pose of the physical fiducial reference 1014 in a local camera coordinate system of the specific fixed camera 1004 that captured the image; and (ii) determining the 3D pose in the world coordinate system 1018 based on the 3D pose in the local camera coordinate system and the known pose of the specific fixed camera 1004 in the world coordinate system 1018 (i.e. by transforming from the local camera coordinate system to the world coordinate system 1018).

In examples comprising a plurality of fixed cameras 1004 (such as that of FIG. 17) and receiving a plurality of corresponding fixed camera images, the second step 18184 may comprise: (i) determining, for each fixed camera image, coarse 3D pose values of the physical fiducial reference 1014 based on the dimensions and pose of the physical fiducial reference 1014 in the fixed camera image; and (ii) determining the 3D pose of the physical fiducial reference 1014 by averaging the coarse 3D pose values of the plurality of fixed camera images or performing an optimisation routine to reduce a total error between the 3D pose of the physical fiducial reference 1014 and the coarse 3D pose values of the plurality of fixed camera images. In other words, the method determines a 3D pose value for each fixed camera image and then applies a form of averaging or optimisation to obtain a more accurate value of the 3D pose of the physical fiducial reference 1014 in the world coordinate system 1018. In this way, the method can average out errors or noise in the calculation of the 3D pose for a single fixed camera image.

In other examples, comprising a plurality of fixed cameras 1004 (such as that of FIG. 17) and receiving a plurality of corresponding fixed camera images, the second step 18184 may comprise determining the 3D pose of the physical fiducial reference in the world coordinate system 1018 by triangulating the 3D pose of the physical fiducial reference 1014 based on the 2D pose of the fiducial reference in each fixed camera image (e.g. using back-projection as described in above).

A third step 18186 comprises receiving one or more roving images 17178 from a mobile camera 1005, each roving image comprising the physical fiducial reference 1014 and the virtual fiducial reference 17180. The virtual fiducial reference 17180 is displayed at a predetermined position (and orientation) on the fixed screen 1008.

A fourth step 18188 comprises determining a 3D geometrical relationship between the physical fiducial reference 1014 and the virtual fiducial reference 17180 based on the dimensions and pose of each of the physical fiducial reference 1014 and the virtual fiducial reference 17180 in each roving image 17178. The fourth step 18188 may determine the 3D geometrical relationship based on the 3D pose of each of the physical fiducial reference 1014 and the virtual physical reference 17178 in a mobile camera coordinate system of the mobile camera 1005. Determining the 3D pose of each of the physical fiducial reference 1014 and the virtual physical reference 17178 may be performed in the same way as described above for determining the 3D pose of the physical fiducial reference 1014 in the second step 18184. Determining the 3D geometrical relationship may comprise determining a relationship transform for transforming the 3D pose of the physical fiducial reference 1014 to the 3D pose of the virtual fiducial reference 17180. Advantageously, the exact pose of the mobile camera 1005 (in the world coordinate system 1018 or indeed any coordinate system) when capturing the roving images does not need to be known to determine the relative relationship between the physical fiducial reference 1014 and the virtual fiducial reference 17180.

In some examples, the one or more roving images 17178 comprise a plurality of roving images, captured by the mobile camera 1005 in a corresponding plurality of different positions/poses. The mobile camera 1005 may be moved manually or automatically between the different poses. In such examples, the fourth step 18188 may comprise: (i) determining, for each roving image 17178, a coarse 3D geometrical relationship value between the physical fiducial reference 1014 and the virtual fiducial reference 17180 based on the dimensions and pose of each of the physical fiducial reference 1014 and the virtual fiducial reference 17180 in the roving image 17178; and (ii) determining the 3D geometrical relationship between the physical fiducial reference 1014 and the virtual fiducial reference 17180 by averaging the 3D coarse geometrical relationship values of the plurality of roving images 17178 or performing an optimisation routine to reduce a total error between the 3D geometrical relationship between the physical fiducial reference 1014 and the virtual fiducial reference 17180 and the coarse 3D geometrical relationship values of the plurality of roving images 17178. In this way, the method can average out errors or noise in the calculation of the geometrical relationship for a single roving image 17178.

A fifth step 18190 comprises determining the 3D pose of the fixed screen 1008 with respect to the world coordinate system 1018 (i.e. with respect to the one or more fixed cameras 1004) based on the 3D pose of the physical fiducial reference 1014 in the world coordinate system 1018 (determined in the second step 18184) and the 3D geometrical relationship between the physical fiducial reference 1014 and the virtual fiducial reference 17180 (determined in the fourth step 18188) and the predetermined position that the virtual fiducial reference 10180 is positioned at on the screen 1008. For example, the fifth step 18190 may comprise multiplying the 3D pose of the physical fiducial reference 1014 in the world coordinate system 1018 by the relationship transform to determine the 3D pose of the virtual fiducial reference 17180 in the world coordinate system 1018. Determining the pose of the screen 1008 in the world coordinate system 1018 can then be determined by offsetting the pose of the virtual fiducial reference 17180 in the world coordinate system 1018 using the predetermined position (and orientation) of the virtual fiducial reference 17180 on the screen 1008.

A sixth step 18192 comprises performing an eye gaze tracking operation on images, received from the one or more fixed cameras 1004, of a user's face viewing the fixed screen 1008, using the 3D pose of the fixed screen 1008 with respect to the world coordinate system 1018. For example, the eye gaze tracking operation may form part of the training image generation method of FIG. 2. The eye gaze tracking operation may comprise at least part of the steps 9118, 9124, 9128 and 9130 of the method of FIG. 9 described above, for example, the receiving of the first and second images and the determination of the first and second gaze rays (step 11144 of the sub-method of FIG. 11). In some examples, the eye tracking operation may include receiving images of the user's face while viewing a gaze reference marker on the fixed screen. The eye tracking operation may include determining a gaze ray using the pose of the fixed screen 1008 in the world coordinate system 1018, a position of the gaze reference marker on the screen and the received images of the user's face. For example, the eye tracking operation may determine a gaze origin based on the images of the user's face and determine a gaze ray from the gaze origin to the position of the gaze reference marker in the world coordinate system 1018. Determination of the gaze origin from images of a user's face can be performed using eye glints from the illuminators 1006 and other known techniques and will not be described here. In some examples, the eye tracking operation may estimate an accuracy of an eye-gaze tracking algorithm by comparing a calculated gaze ray, calculated by processing a received image with the eye-gaze tracking algorithm, with the position of the reference marker in the world coordinate system 1018. It will be appreciated that knowing the position of the fixed screen 1008 in the world coordinate system 1018 (i.e., with respect to the fixed cameras 1004) can be used in a number of other known remote eye tracking operations that are not detailed here.

Illumination Variation

Illumination variation, for example from sunlight, can present a major difficulty for head-pose detection algorithms used in remote eye tracking. For example, driver monitoring in automotive applications can be subject to a huge variation in ambient light conditions. Therefore, the methods and systems disclosed herein may generate groups of training images, with each group of training images comprising images with the same ground truth head pose value under a range of different illumination conditions.

The head pose value may be determined using any of the relevant systems and methods disclosed herein, such as the methods of FIGS. 2, 5 and 8.

Returning to FIG. 1, the system 1000 may be used for generating training images with a range of illumination conditions for a machine learning head-pose detection algorithm.

The system 1000 can make use of the plurality of cameras 1004 arranged at different fixed poses in the world coordinate system 1018 to capture images of the user's head. The system 1000 can also make use of the plurality of illuminators 1006, each arranged at a different pose in the world coordinate system 1018 to illuminate the user's head.

Figure 19:
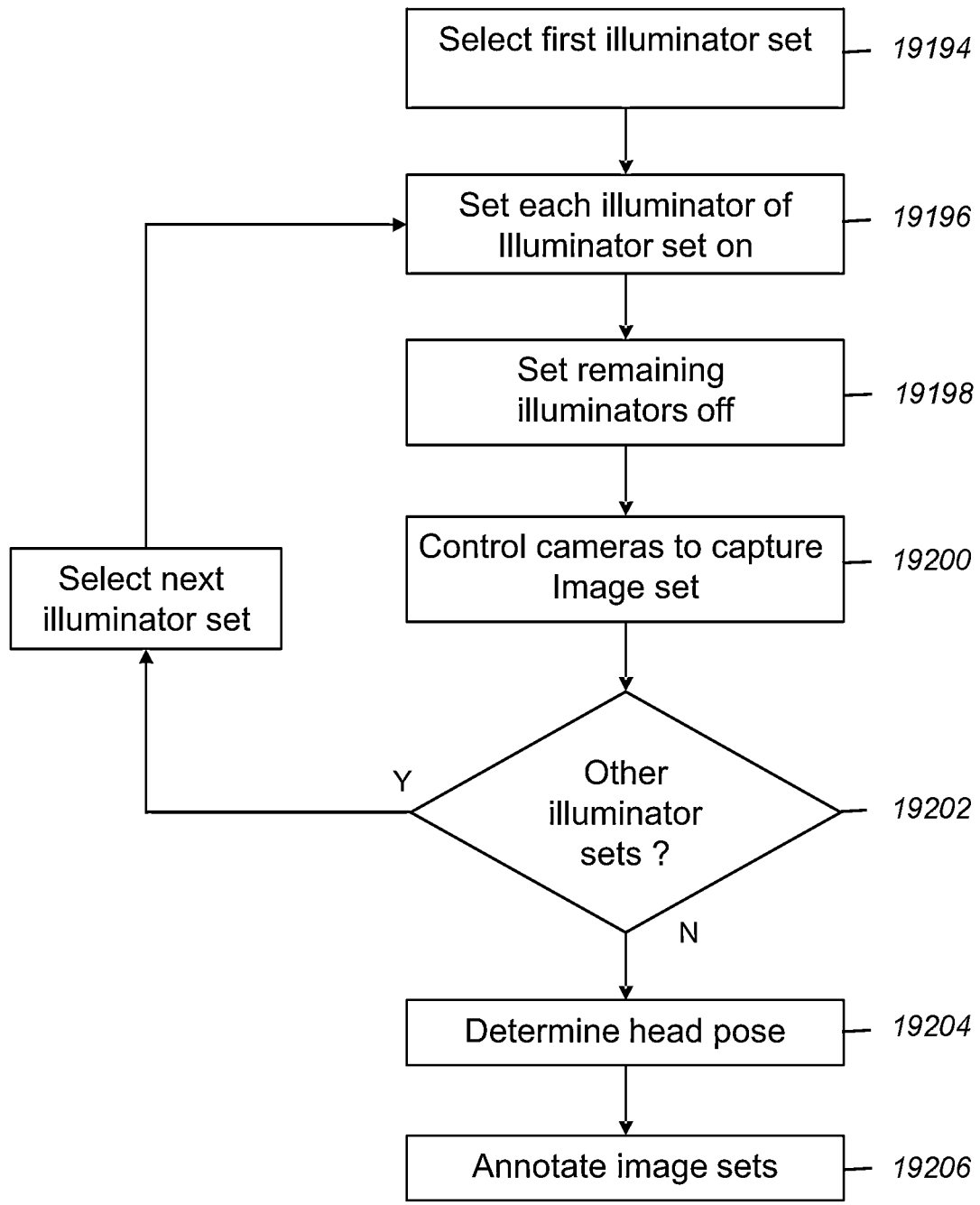
FIG. 19 illustrates a method of generating different groups of training images having different illumination conditions according to an embodiment of the present disclosure.

The processor 1016, which may be implemented as a controller, may control the cameras 1004 and the illuminators 1006 and generate different groups of training images having different illumination conditions according to the method of FIG. 19.

At a first step 19194, the controller 1016 selects a first illuminator set of a plurality of illuminator sets. Each illuminator set comprises at least one of the plurality of illuminators 1006. In some examples, each illuminator set consists of exactly one illuminator of the plurality of illuminators 1006. Using illuminator sets having only a single illuminator can advantageously provide a larger amount of illumination conditions and a resulting number of training images.

At a second step 19196, the controller 1016 sets each illuminator of the first illuminator set to an ON state.

At a third step 19198, the controller 1016 sets all remaining illuminators of the plurality of illuminators 1006 to an OFF state. In this way, a subset (the first illuminator set) of the plurality of illuminators are turned on, with the remaining illuminators off.

At a fourth step 19200, the controller 1016 controls the plurality of cameras 1004 to capture a corresponding plurality of images, one from each camera, to form an image set.

At a fifth step 19202, the controller 1016 determines if there are any other illuminator sets in the plurality of illuminator sets, for which the second to fourth steps 19196-19200 have not been performed. If there are remaining illuminator sets, the controller 1016 selects the next illuminator set and repeats the second to fifth steps 19196-19202.

By looping through the second to fifth steps 19196-19202, the controller 1016 captures a plurality of image sets with each image set having a different illumination condition due to the different illuminator set. The controller 1016 may perform the second to fourth steps 19196-19202 and capture all the image sets for each different illuminator set within a total capture time such that the head pose of the user is unlikely to change. For example, the total capture time may range from 100 to 1000 milliseconds and in some examples may be less than 500 milliseconds.

Once the second to fourth steps 19194-19200 have been performed for all illuminator sets, generating a corresponding plurality of image sets, the method proceeds to a sixth step 19204 at which the controller 1016 determines a head pose value of the user's head with respect to the world coordinate system 1018. The controller 1016 may determine the head pose value using any system or method disclosed herein. The controller 1016 may use triangulation and back-projection to determine the head pose value based on a pose of a head module fiducial reference 1011 in each image of at least one image set, and the fixed pose of each camera 1004 in the world coordinate system 1018. In some examples, the controller 1016 may determine the head pose value for a plurality of the image sets to confirm that the head pose of the user did not vary during the capture of all the image sets. For example, the controller 1016 may determine a first head pose value for a first image set and determine a second head pose value for a second image set (for example the last image set captured). The controller 1016 may only proceed to a seventh step 19206 if a difference between the first head pose value and the second head pose value is less than a movement threshold.

At a seventh step 19206, the controller 1016 determines, for each camera of the plurality of cameras 1004, an image head pose value corresponding to groups of images captured by the same camera (i.e., one image from each image set). The image head pose value may be considered as a local head pose value with respect to a frame of reference of the camera that captured the image. The controller 19206 can determine the image head pose value by transforming the head pose value in the world coordinate system 1018 using the pose of the camera, that captured the image, in the world coordinate system 1018. The controller 1016 then proceeds to annotate each image in the group of images corresponding to the same camera with the image head pose value to generate a corresponding group of training images. Each group of training images will then comprise images annotated with the same head pose value under a range of different illumination conditions.

Figure 20:
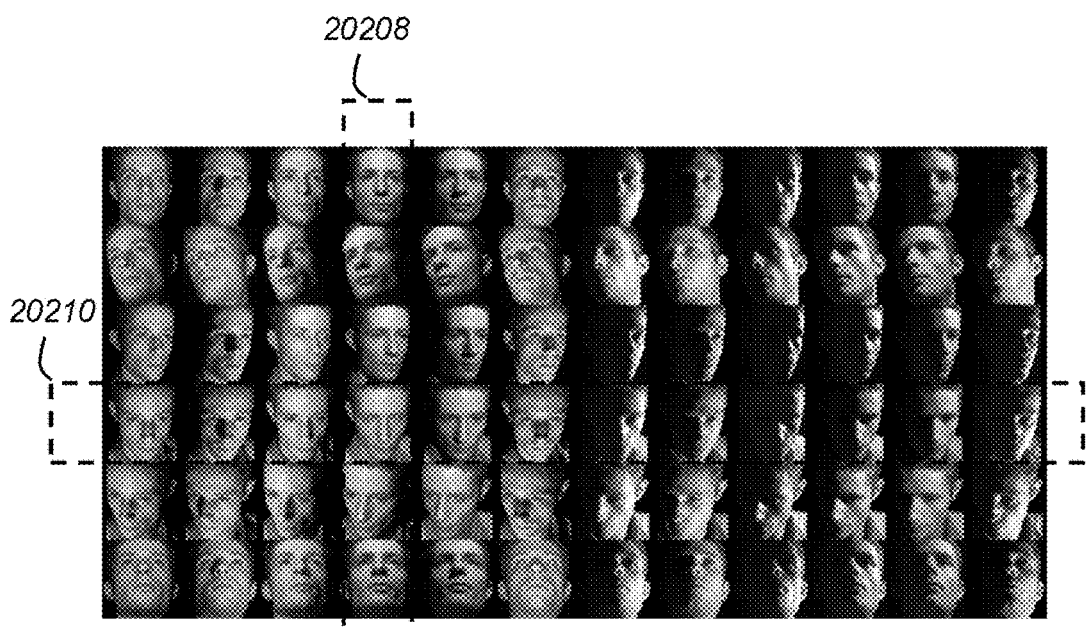
FIG. 20 illustrates an example output from the method of FIG. 19.

FIG. 20 illustrates an example output from the method of FIG. 19. In this example, images were captured by six cameras each having a different fixed pose in the world coordinate system 1018. Illumination was provided by twelve illuminators and each illuminator set comprised a single illuminator resulting in twelve illuminator sets. In other words, each of the twelve illuminators were switched on in turn, with the remaining illuminators switched off, and six images captured for each illuminator (twelve loops of second to fourth steps 19196-19200).

Image sets 20208 comprising six images captured by the six cameras for each illuminator set are arranged vertically. Groups of images 20210 corresponding to an image from the same camera, showing the same image head pose under different illumination conditions, are arranged horizontally. The different illumination conditions correspond to the twelve illuminator sets.

Each image in a group of images 20210 can be annotated with the same image head pose value. The resulting groups of training images showing the same head pose under different illumination conditions provide a rich source of training data for ML head pose detection algorithms.

In some examples, the controller 1016 can combine two or more images in a group of images 20210 (images from the same camera under different illumination) to form further training images. The further training images may be annotated with the image head pose value corresponding to the group of images 20210. The further training images will provide training data with the same head pose value under yet further illumination conditions.

Light intensity is an additive quantity so in some examples, the controller 1016 may sum the two or more images. For example, if the illuminator sets correspond to single illuminators, combining two images provides a further training image corresponding to how an image would appear with the two corresponding illuminators switched on. In yet further examples, the controller 1016 may apply weightings to the two or more images and calculate a weighted sum to form the further training image. In this way, groups of training images can comprise the same head pose value with a huge range of illumination conditions. For example, the twelve images in each group of training images 20210 in FIG. 20 could be combined using a non-weighted sum in $2^{12}$ (2 to the power of 12) combinations. Weighted summing can provide yet further training data.

The combining of two or more images to form further training images illustrated another advantage of using illuminator sets comprising only a single illuminator. The resulting images in a group of images can be combined in a more granular manner to provide a wider range of illumination conditions.

In-Car Ground Truth

The systems and methods above provide a number of approaches to obtaining a rich set of training data for training a ML head pose detection algorithm for a remote eye tracking system. Following training of the ML head pose detection algorithm and an associated remote eye gaze tracking algorithm, the two algorithms may be validated in an example use setting.

Figure 21:
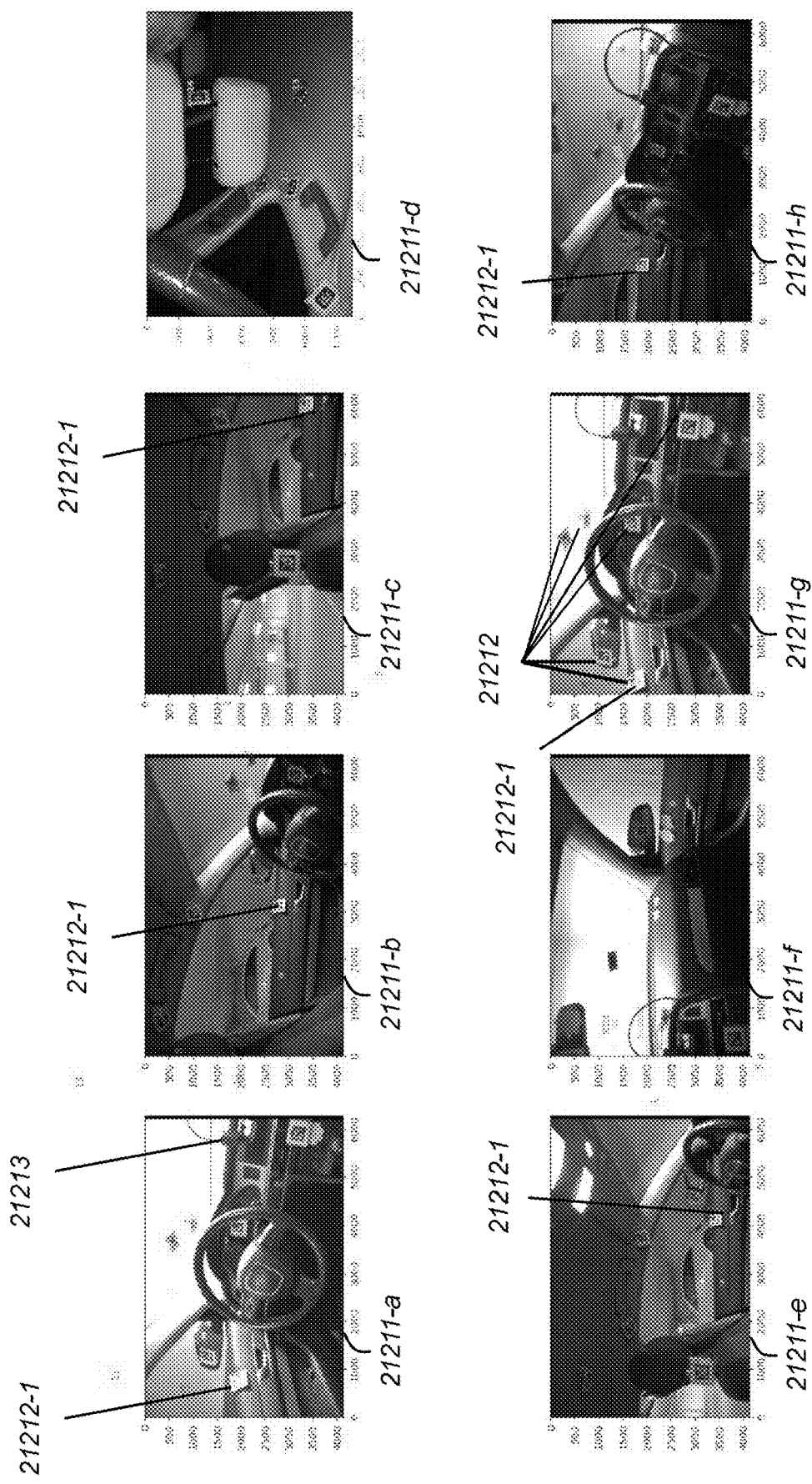
FIG. 21 shows first to eighth camera images of a set-up of an example use setting for assessing an accuracy of a trained ML head pose detection and eye gaze algorithm, according to an embodiment of the present disclosure.

FIG. 21 shows first to eighth camera images 21211-a-21211-h of a set-up of an example use setting for assessing an accuracy of a trained ML head pose detection and eye gaze algorithm, according to an embodiment of the present disclosure.

In this embodiment, the example use setting is the interior of a vehicle for a driver monitoring application. Each of the first to eighth images (21211-a-21211-h) are captured by a mobile camera arranged at a respective pose in an environment of the remote eye tracking system (the example use-setting).

The environment includes a total plurality of fiducial references 21212 (labelled in the seventh image 21211-g) with each fiducial reference 21212 arranged at a different fixed pose in the environment of the remote eye tracking system. Each fiducial reference 21212 has known dimensions and a plurality of features that enable a 3D pose of the fiducial reference to be determined from one of the mobile camera images (with respect to a mobile camera coordinate system). In this example, each fiducial reference comprises an Aruco target.

Each of the first to eighth images 21211-a-21211-h capture a respective plurality of fiducial references 21212 that correspond to a subset of the total plurality of fiducial references 21212. However, each image includes at least one common fiducial reference that may be identified in a different image. For example, the first image 21211-a, second image 21211-b, the third image 21211-c, the fifth image 21211-e, the seventh image 21211-g and the eighth image 21211-h all capture a first common fiducial reference 21212-1.

Figure 22:
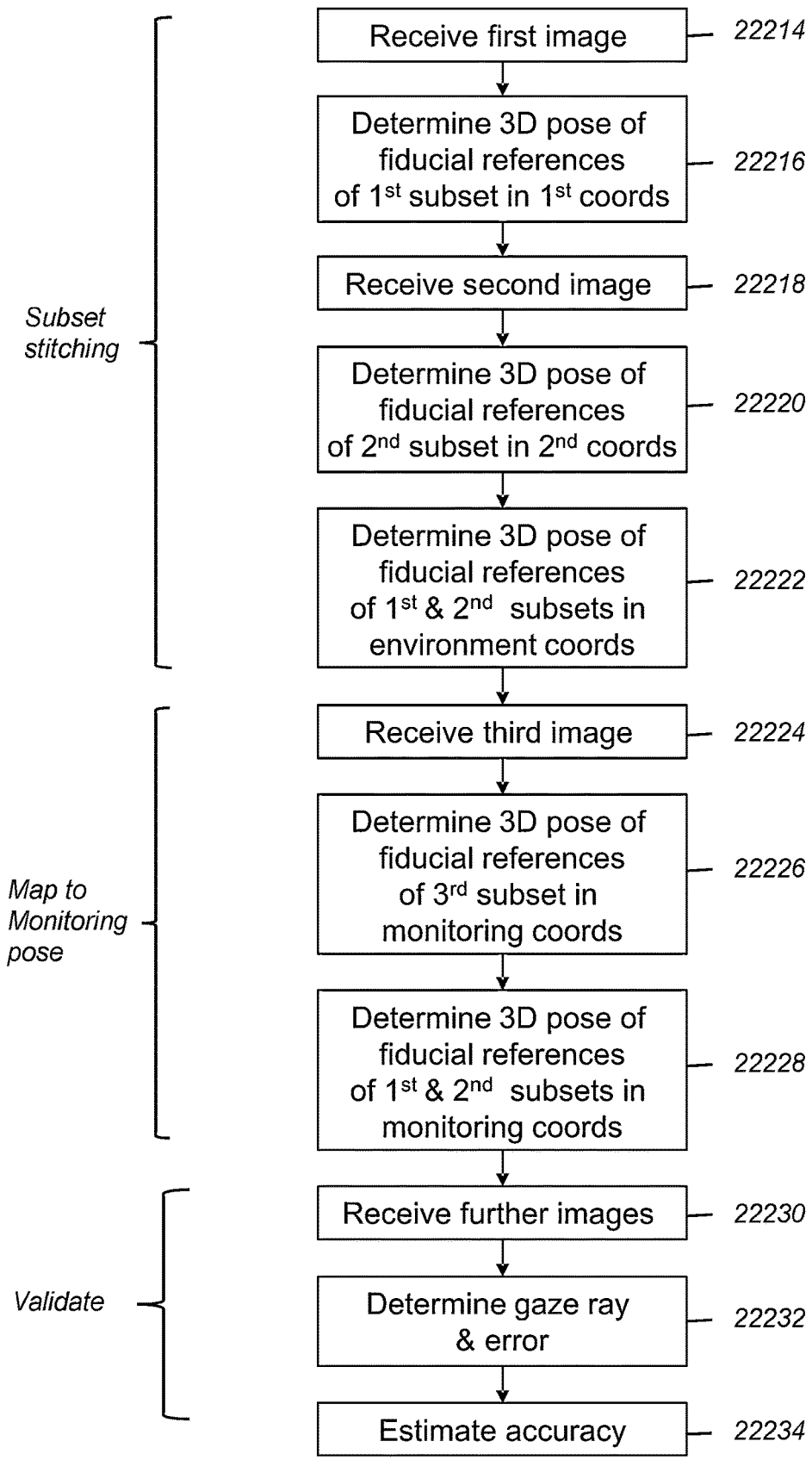
FIG. 22 illustrates a method for assessing an accuracy of the trained ML head pose detection and eye gaze algorithm for the remote eye tracking system according to an embodiment of the present disclosure.

FIG. 22 illustrates a method for assessing an accuracy of the trained ML head pose detection and eye gaze algorithm for the remote eye tracking system according to an embodiment of the present disclosure. The method may be used with the set-up of FIG. 21.

A first step 22214 comprises receiving a first image 21211-a captured by the mobile camera arranged in a first pose in the environment of the remote eye tracking system. As described above, the first image 21211-a includes a first plurality of fiducial references comprising a first subset of a total plurality of fiducial references 21212. Each fiducial reference of the total plurality of fiducial references 21212 has: (i) a fixed pose in the environment of the remote eye tracking system; and (ii) known dimensions and a plurality of features for identifying the 3D pose of the fiducial reference from a mobile camera image with respect to the mobile camera coordinate system.

A second step 22216 comprises determining the 3D pose of each fiducial reference of the first subset in a first coordinate system. The first coordinate system is the mobile camera coordinate system when the mobile camera is arranged in the first pose (to capture the first image 21211-a). In other words, the first coordinate system corresponds to a coordinate system of the first image 21211-a. The 3D pose of each fiducial reference in the first coordinate system is determined based on the known dimensions and a pose of the respective fiducial reference in the first image 21211-a.

A third step 22218 comprises receiving a second image 21211-b captured by the mobile camera arranged in a second pose, different to the first pose, in the environment. As illustrated, the second image 21211-*b* includes a second plurality of fiducial references comprising a second subset of the total plurality of fiducial references 21212, different to the first subset. The first subset and the second subset each comprise at least one common fiducial reference 21212-1 which can be seen in both the first image 21211-*a* and the second image 21211-*b*.

A fourth step 22220 comprises determining the 3D pose of each fiducial reference of the second subset in a second coordinate system based on the dimensions and pose of the respective fiducial reference in the second image 21211-*b*. The second coordinate system is the mobile camera coordinate system when the mobile camera is arranged in the second pose to capture the second image 21211-*b* (i.e., the coordinate system of the second image 21211-*b*). The fourth step 22220 is performed in a similar manner to the second step 22216.

At this point, the relative poses of the fiducial references in the first subset are known with respect to each other, and the relative poses of the fiducial references in the second subset are known with respect to each other. However, the poses of the first subset relative to the poses of the second subset are not known.

A fifth step 22222 comprises determining the relative 3D pose of each fiducial reference of the first subset and the second subsets, in an environment coordinate system. The relative 3D pose can be determined based on: (i) the 3D pose of each fiducial reference of the first subset in the first coordinate system; (ii) the 3D pose of each fiducial reference of the second subset in the second coordinate system; and (iii) a difference between the 3D pose of the at least one common fiducial reference 21212-1 in the first coordinate system and the second coordinate system. The difference between the 3D pose of the common fiducial reference 21212-1 in the first and second coordinate systems can define a mapping operator between the first and second coordinate systems. As a result, the 3D poses of the fiducial references of the first subset in the first coordinate system can be mapped to the second coordinate system using the mapping operator. Similarly, the 3D poses of the fiducial references of the second subset in the second coordinate system can be mapped to the first coordinate system using the mapping operator. In some examples the environment coordinate system may be the first coordinate system or the second coordinate system. As a result, all the relative 3D poses can be defined with respect to the first or second coordinate systems accordingly. Following, the fifth step 22222 the first subset and second subset have effectively been stitched together to provide a fiducial reference map of the fiducial references in the first and second subset with respect to a common coordinate system. It is important to note that a value of the pose of the first coordinate system and the second coordinate system with respect to some ground reference is not required because of the presence of the common fiducial reference. The common fiducial reference enables the determination of the relative pose of the first coordinate system with respect to the second coordinate system.

It will be appreciated that the third to fifth steps may be repeated to stitch together further subsets of fiducial references from further images (such as the third to eight images 21211-*c*-21211-*h*), as long as at least one of the further images has at least one common fiducial reference present in the first and/or second subset and each further image has at least one common fiducial reference present in another of the further images and/or the first and/or second image.

A sixth step 22224 comprises receiving a third image (not illustrated) captured by a camera arranged in a fixed user monitoring pose 21213 in the environment. The camera may comprise the mobile camera or a fixed monitoring camera arranged in the fixed user monitoring pose 21213. The fixed user monitoring pose 21213 corresponds to the pose of the monitoring camera arranged to monitor a user in the environment and perform remote eye tracking (with the ML algorithms). The third image includes a third plurality of fiducial references comprising a third subset of the total plurality of fiducial references 21212. The third subset includes at least one further common fiducial reference that is present in the first subset and/or the second subset. The at least one further common fiducial reference may be any fiducial reference common to the third image and either or both of the first and second image 21211-*a*, 21211-*b*.

A seventh step 22226 comprises determining the 3D pose of each fiducial reference of the third subset in a monitoring coordinate system based on the dimensions and pose of the respective fiducial reference in the third image. The monitoring coordinate system corresponds to a camera coordinate system when the camera is arranged in the fixed user monitoring pose in the environment (i.e., a coordinate system of the third image). The seventh step 22226 is performed in a similar manner to the second and fourth steps 22216, 22218.

An eighth step 22228 comprises determining the 3D pose of each fiducial reference of the first subset and the second subset in the monitoring coordinate system based on: (i) the relative 3D pose of each fiducial reference of the first and second subsets in the environment coordinate system (determined in the fifth step 22222); and (ii) the difference between the 3D pose of the at least one further common fiducial reference in the environment coordinate system and the monitoring coordinate system. The eighth step 22228 is similar to the fifth step in that the mapping operator is determined between the environment coordinate system and the monitoring coordinate system using the difference in the determined pose of the further common fiducial reference in the environment coordinate system and the monitoring coordinate system.

At this point, the pose of each fiducial reference of the total plurality of fiducial references 21212 is known with respect to the monitoring coordinate is known. As a result, the method can continue to capture user image data using a camera arranged in the fixed user monitoring pose 21213 to validate the ML algorithms.

A ninth step 22230 comprises receiving further images captured by the camera in the fixed user monitoring pose 21213. Each further image includes a user looking at a different one of the total plurality of fiducial references 21212, denoted as the test fiducial reference.

A tenth step 22232 comprises, for each further image, determining a head pose value and a gaze ray of the user in the monitoring coordinate system by processing the further image using the trained ML head pose detection and eye gaze algorithm. The tenth step 22232 further comprises, for each further image, determining an error in the gaze ray based on a minimum distance from the gaze ray to the 3D position of the respective test fiducial reference. The distance can be determined using known algebra for calculating the minimum distance form a point to a line.

An eleventh step 22234 comprises estimating an accuracy of the trained ML head pose detection and eye gaze algorithm based on the error of the gaze ray of each further image. For example, the errors may be averaged, or analysed in another statistical way, to estimate an accuracy value for the algorithm.

The described set-up and method enable the accuracy of the ML algorithm to be assessed in a repeatable numeric way to support algorithm improvement and/or validation. Furthermore, the capturing of the images and determination of the relative pose of the fiducial references 21212 in the monitoring coordinate system can be determined in a matter of minutes. In contrast, other approaches utilising accurate distance measurements can take a number of hours and require expensive equipment. The disclosed set-up and image processing method advantageously avoid any requirement for measuring precise relative poses of the fiducial references 21212 or cameras in the set-up. The disclosed set-up and image processing method can also advantageously be performed without a screen to display stimulus points to the user (although in some embodiments one or more of the fiducial references may be provided on a screen).

Throughout the present specification, the descriptors relating to relative pose/orientation and position, such as "horizontal", "vertical", "top", "bottom" and "side", are used in the sense of the orientation of the apparatus and geometry as presented in the drawings. However, such descriptors are not intended to be in any way limiting to an intended use of the described or claimed invention.

It will be appreciated that any reference to "close to", "before", "shortly before", "after" "shortly after", "higher than", or "lower than", etc, can refer to the parameter in question being less than or greater than a threshold value, or between two threshold values, depending upon the context.

CLAUSES

Clause 1. A motion-capture head module for tracking a head pose of a user comprising:
- a headband for attaching to a head of the user;
- a post extending from the headband; and
- at least three markers, wherein each marker is coupled to the post by a respective one of at least three branching members extending from the post, such that the at least three markers have a first fixed geometrical relationship with respect to each other.

Clause 2. The head module of clause 1, wherein the headband comprises a flexible headband.

Clause 3. The head module of clause 1 or clause 2, wherein the post comprises a rigid post and the at least three branching members comprise rigid branching members.

Clause 4. The head module of any preceding clause, wherein the at least three markers comprise at least three reflective markers.

Clause 5. The head module of any preceding clause, wherein the first fixed geometrical relationship comprises an irregular relationship.

Clause 6. The head module of any preceding clause, wherein each marker comprises a different size.

Clause 7. The head module of any preceding clause, wherein the headband comprises a flexible headband and the motion-capture head module further comprises:
- a second post extending from the headband; and
- at least three further markers, wherein each further marker is coupled to the second post by a respective one of at least three further branching members extending from the second post, such that the at least three further markers have a second fixed geometrical relationship with respect to each other.

Clause 8. The head module of clause 7, wherein the second fixed geometrical relationship is different to the first fixed geometrical relationship.

Clause 9. A method for tracking a pose of a head of a user, the method comprising:
- receiving a first image, captured by a first camera at a first time, of the user wearing a motion-capture head module, wherein the motion capture head module comprises:
  - a headband;
  - a first cluster of markers comprising a first marker, a second marker and a third marker having a first fixed geometrical relationship with respect to each other; and
  - a second cluster of markers comprising a fourth marker, a fifth marker and a sixth marker, having a second fixed geometrical relationship with respect to each other;
- receiving a second image, captured by a second camera at the first time, of the user wearing the motion-capture head module, wherein the first camera and the second camera each have a different known pose in a world coordinate system and wherein the first to sixth markers are visible in both the first and second images;
- triangulating three-dimensional (3D) coordinates of each marker in each of the first cluster and the second cluster in the world coordinate system, based on the position of each marker in each of the first image and the second image;
- individually associating each triangulated 3D coordinate with a respective one of the first to sixth markers using the first and second fixed geometrical relationships;
- determining a third fixed geometrical relationship between each of the first to sixth markers based on the specifically associated 3D coordinates of each marker;
- receiving further first images captured by the first camera at a series of time points and receiving corresponding further second images captured by the second camera at the series of time points, wherein each further first image and each further second image capture the user wearing the motion-capture head module;
- for each corresponding pair of further first and second images:
  - triangulating the 3D coordinates of at least three markers of the first to sixth markers in the world coordinate system based on the position of each of the at least three markers in the further first image and the further second image; and
  - determining a pose of a head module coordinate system with respect to the world coordinate system based on the 3D coordinates of the at least three markers and the third fixed geometrical relationship.

Clause 10. A method of generating training images for a machine learning head-pose detection algorithm, the method comprising:
- the method of clause 9; and
- determining a head pose value for each further first image and further second image based on the respective pose of the head module coordinate system and the pose of the first camera and the second camera in the world coordinate system; and
- generating first and second training images by annotating the first further images and the second further images with the respective head pose value.

Clause 11. The method of clause 10, wherein determining the head pose value for each further first image and further second image based on the respective pose of the head module coordinate system comprises determining a pose of a head coordinate system with respect to the world coordinate system by transforming the head module coordinate system using a predetermined mapping operator.

Clause 12. The method of clause 10 or clause 11, wherein the headband is a flexible headband and the method further comprises:
determining a deformation of the headband based on the individually associated 3D coordinates of one or more markers in each of the first cluster and the second cluster;
determining a 3D profile of the headband in the head module coordinate system based on the deformation of the headband;
determining a two-dimensional, 2D, profile of the headband in each of the further first images and further second images based on:
a pose of the head module coordinate system with respect to the world coordinate system in the respective further first image or further second image;
and a pose of the respective first or second camera in the world coordinate system; and
generating the first and second training images by painting over the 2D profile of the headband in each of the respective further first images and further second images.

Clause 13. The method of any of clauses 9 to 12, wherein the second fixed geometrical relationship is different to the first fixed geometrical relationship.

Clause 14. The method of any of clauses 9 to 13, wherein each marker comprises a different size.

Clause 15. The method of any of clauses 9 to 14, wherein the first fixed geometrical relationship and the second fixed geometrical relationship comprise an irregular relationship.

Clause 16. A calibration device for determining a relationship between a head coordinate system of a user's head and a world coordinate system, the calibration device comprising:
vertical axis face engaging components, aligned along a first axis of the calibration device, the vertical-axis face engaging components comprising:
a first vertical axis face engaging component for engaging a first feature along a vertical axis of the user's face; and
a second vertical axis face engaging component for engaging a second feature along the vertical axis of the user's face;
eye axis reference components, aligned along a second axis of the calibration device, the eye axis reference components comprising:
a first adjustable eye axis reference component comprising a first visual reference for adjusting along the second axis of the calibration device to align with a first eye of the user; and
a second adjustable eye axis reference component comprising a second visual reference for adjusting along the second axis of the calibration device to align with a second eye of the user; and
a calibration device fiducial reference having a predetermined geometrical relationship with respect to the first axis and the second axis of the calibration device.

Clause 17. The calibration device of clause 16, wherein the first feature and the second feature comprise different ones of: a chin, a forehead, a sellion, a tip of a nose, a septum or a philtrum of the user.

Clause 18. The calibration device of clause 16 or 17, wherein the first and second adjustable eye reference components are mounted on a synchronous adjustment mechanism.

Clause 19. A method for determining a relationship between a head coordinate system of a user's head and a world coordinate system, the method comprising:
receiving a first image, captured by a first camera at a first time, of the user with a calibration device aligned to their face, the calibration device comprising:
vertical axis face engaging components, aligned along a first axis of the calibration device, the vertical axis face engaging components comprising:
a first vertical axis face engaging component for engaging a first feature along a vertical axis of the user's face; and
a second vertical axis face engaging component for engaging a second feature along the vertical axis of the user's face;
eye axis reference components, aligned along a second axis of the calibration device, the eye axis reference components comprising:
a first adjustable eye axis reference component comprising a pinhole for adjusting along the second axis of the calibration device to align with a first eye of the user; and
a second adjustable eye axis reference component comprising a pinhole for adjusting along the second axis of the calibration device to align with a second eye of the user; and
a calibration device fiducial reference having a predetermined geometrical relationship with respect to the first axis and the second axis of the calibration device;
receiving a second image, captured by a second camera at the first time, of the user with the calibration device aligned to their face, wherein the first camera and the second camera each have a different known pose in a world coordinate system;
triangulating a three-dimensional, 3D, pose of the calibration device fiducial reference in the world coordinate system based on a pose of the calibration device fiducial reference in both the first image and the second image;
determining the first axis and the second axis of the calibration device in the world coordinate system based on the 3D pose of the calibration device fiducial reference and the predetermined geometrical relationship; and
determining a pose of the head coordinate system in the world coordinate system based on the first axis and the second axis of the calibration device.

Clause 20. The method of clause 19, wherein the calibration device fiducial reference comprises at least three markers having a fixed relative geometrical relationship, and wherein triangulating the 3D pose of the calibration device fiducial reference comprises triangulating the 3D position of each marker based on the position of the marker in each of the first image and the second image.

Clause 21. The method of clause 19 or 20, wherein determining the pose of the head coordinate system comprises:
determining a first axis of the head coordinate system as the first axis of calibration device;
determining a second axis of head coordinate system as the second axis of calibration device; and determining a third axis of the head coordinate system as an axis perpendicular to both the first axis and the second axis of the calibration device.

Clause 22. The method of clause 21, further comprising determining an origin of the head coordinate system as a 3D position at a predetermined distance behind the calibration device, along the third axis of the head coordinate system.

Clause 23. The method of any of clauses 19 to 22, wherein the first image and the second image include the user wearing a motion-capture head module with a head module fiducial reference, and wherein the method further comprises:
- determining a pose of the head module coordinate system with respect to the world coordinate system based on the pose of the head module fiducial reference in the first image and the second image;
- determining a mapping operator for transforming the head module coordinate system to the head coordinate system;
- receiving, a further first image captured by the first camera at a second time and a further second image captured by the second camera at the second time, of the user wearing the motion-capture head module in the absence of the calibration device;
- determining a pose of the head module coordinate system with respect to the world coordinate system at the second time based on the pose of the head module fiducial reference in the further first image and the further second image;
- determining a pose of the head coordinate system with respect to the world coordinate system at the second time based on the pose of the head module coordinate system with respect to the world coordinate system at the second time, and the mapping operator;
- determining a head pose value of the user at the second time, for each of the further first image and the further second image, based on the pose of the head module coordinate system with respect to the world coordinate system at the second time and the pose of the respective first camera or second camera in the world coordinate system; and
- annotating the first further image and the second further image with the respective head pose value.

Clause 24. A method for determining an eye-axis of a user with respect to a world coordinate system, the method comprising:
- receiving a plurality of first images, captured by a first camera at a series of time points, of the user wearing a motion-capture head module comprising a head module fiducial reference and looking at one of a plurality of reference points with known positions in the world coordinate system, wherein each of the plurality of first images comprise a first annotated pupil position for a first eye of the user and a second annotated pupil position for a second eye of the user;
- receiving a plurality of second images of the user, captured by a second camera at the series of time points, wherein the first camera and the second camera each have a different known pose in the world coordinate system;
- for each pair of first and second images captured at the same time point, determining a pose of a head module coordinate system with respect to the world coordinate system, by triangulating the pose of the head module fiducial reference in the world coordinate system based on the pose of the head module fiducial reference in the first image and the second image;
- determining a first centre of rotation of the first eye and a first radius of the first eye based on:
  - the first annotated pupil position;
  - the pose of the head module coordinate system with respect to the world coordinate system; and
  - the known position of the reference point in the world coordinate system, for each of the plurality of first images;
- determining a second centre of rotation of the second eye and a second radius of the second eye based on:
  - the second annotated pupil position;
  - the pose of the head module coordinate system with respect to the world coordinate system; and
  - the reference point in the world coordinate system, for each of the plurality of first images;
and
- determining the eye axis as a vector between the first centre of rotation and the second centre of rotation.

Clause 25. The method of clause 24, wherein determining a first centre of rotation and a first radius of the first eye comprises:
- setting an initial value of the first centre of rotation and an initial value of the first radius;
- for each first image in the plurality of first images:
  - determining a first camera ray in the world coordinate system by back-projecting from a position of the first camera through the first annotated pupil position in the first image;
  - transforming the first camera ray to the head module coordinate system using the pose of the head module coordinate system with respect to the world coordinate system;
  - determining a position of the reference point, associated with the first image, in the head module coordinate system using the known position of the reference point in the world coordinate system and the pose of the head module coordinate system with respect to the world coordinate system;
  - determining a first gaze ray extending from the first centre of rotation towards the position of the reference point in the head module coordinate system, with a length equal to the first radius; and
  - determining a first minimum distance between the first camera ray and a distal end of the first gaze ray; and
- iteratively adjusting the values of the first centre of rotation and the first radius and recalculating the first gaze ray for each first image to select values of the first centre of rotation and the first radius that reduce a first error value, wherein the first error value is based on the value of the first minimum distance for each first image, and wherein,
- determining a second centre of rotation and a second radius of the second eye comprises:
- setting an initial value of the second centre of rotation and an initial value of the second radius;
- for each first image in the plurality of first images:
  - determining a second camera ray in the world coordinate system by back-projecting from a position of the first camera through the second annotated pupil position in the first image;
  - transforming the second camera ray to the head module coordinate system using the pose of the head module coordinate system with respect to the world coordinate system;
  - determining a second gaze ray extending from the second centre of rotation towards the position of the reference point in the head module coordinate system, with a length equal to the second radius; and
determining a second minimum distance between the second camera ray and a distal end of the second gaze ray; and
iteratively adjusting the values of the second centre of rotation and the second radius and recalculating the second gaze ray for each first image to select values of the second centre of rotation and the second radius that reduce a second error value, wherein the second error value is based on the value of the second minimum distance for each first image.

Clause 26. The method of clause 25, wherein the first and second image comprise the user wearing spectacles and wherein the method further comprises:
setting initial values for a position and power of a first lens of the spectacles for the first eye;
setting initial values for a position and power of a second lens of the spectacles for the second eye;
determining the first camera ray and determining the second camera ray by calculating refraction of the respective first or second camera ray by the respective first or second lens;
iteratively adjusting the values of the first centre of rotation, first radius and the position and power of the first lens to select the values of the first centre of rotation, first radius and the position and power of the first lens that reduce the first error value; and
iteratively adjusting the values of the second centre of rotation, second radius and the position and power of the second lens to select the values of the second centre of rotation, second radius and the position and power of the second lens that reduce the second error value.

Clause 27. The method of any of clauses 24 to 26, further comprising:
receiving a calibrating first image, captured by the first camera at a first time, of the user wearing the motion capture head module and with a calibration device aligned to their face, the calibration device comprising:
vertical axis face engaging components, aligned along a first axis of the calibration device, the vertical-axis face engaging components comprising:
a first vertical axis face engaging component for engaging a first feature along a vertical axis of the user's face; and
a second vertical axis face engaging component for engaging a second feature along the vertical axis of the user's face; and
a calibration device fiducial reference having a predetermined geometrical relationship with respect to the first axis of the calibration device.
receiving a calibrating second image, captured by the second camera at the calibration time;
determining a 3D pose of the calibration device fiducial reference with respect to the world coordinate system based on a pose of the calibration device fiducial reference in both the first calibrating image and the second calibrating image;
determining the first axis of the calibration device in the world coordinate system based on the 3D pose of the calibration device fiducial reference with respect to the world coordinate system;
determining a pose of the head module coordinate system with respect to the world coordinate system for the first and second calibrating images, by triangulating the pose of the head module fiducial reference in the world coordinate system based on the pose of the head module fiducial reference in the first calibrating image and the second calibrating image; and
determining a pose of the head coordinate system based on the first axis of the calibration device, the eye-axis and the pose of the head module coordinate system with respect to the world coordinate system for the first and second calibrating images.

Clause 28. The method of clause 27, wherein determining the pose of the head coordinate system comprises:
determining an origin of the head coordinate system with respect to the head module coordinate system as a position equidistant between the first centre of rotation and the second centre of rotation;
determining a vertical axis of the head coordinate system as the first axis of the calibration device with respect to the head module coordinate system by transforming the first axis of the calibration device in the world coordinate system using the pose of the head module coordinate system with respect to the world coordinate system for the first and second calibrating images;
determining a third axis of the head coordinate system as an axis extending from the origin of the head coordinate system and perpendicular to both the vertical axis of the head coordinate system and the eye axis of the head coordinate system, with respect to the head module coordinate system; and
determining a mapping operator for transforming the head module coordinate system to the head coordinate system based on the vertical axis, the eye axis, the third axis and the origin of the head coordinate system, with respect to the head module coordinate system.

Clause 29 The method of 28 further comprising:
receiving, a further first image captured by the first camera at a second time and a further second image captured by the second camera at the second time, of the user wearing the motion-capture head module in the absence of the calibration device;
determining a pose of the head module coordinate system with respect to the world coordinate system at the second time based on the pose of the head module fiducial reference in the further first image and the further second image;
determining a pose of the head coordinate system with respect to the world coordinate system at the second time based on the pose of the head module coordinate system with respect to the world coordinate system at the second time, and the mapping operator;
determining a head pose value of the user at the second time, for each of the further first image and the further second image, based on the pose of the head module coordinate system with respect to the world coordinate system at the second time and the pose of the respective first camera or second camera in the world coordinate system; and
annotating the first further image and the second further image with the respective head pose value.

Clause 30. A method for determining a pose of a fixed screen with respect to one or more fixed cameras for eye gaze tracking, the method comprising:
receiving a fixed camera image from at least one of the one or more fixed cameras, each fixed camera image comprising a physical fiducial reference;
determining a three-dimensional, 3D, pose of the physical fiducial reference in a world coordinate system based on the dimensions and pose of the physical fiducial reference in each fixed camera image;

receiving one or more roving images from a mobile camera, each roving image comprising the physical fiducial reference and a virtual fiducial reference displayed at a predetermined position on the fixed screen;

determining a 3D geometrical relationship between the physical fiducial reference and the virtual fiducial reference based on the dimensions and pose of each of the physical fiducial reference and the virtual fiducial reference in each roving image;

determining the pose of the fixed screen with respect to the world coordinate system based on the 3D pose of the physical fiducial reference in the world coordinate system and the 3D geometrical relationship between the physical fiducial reference and the virtual fiducial reference; and performing an eye gaze tracking operation and/or a head-pose tracking operation on images, received from the one or more fixed cameras, of a user viewing the screen, using the pose of the fixed screen with respect to the world coordinate system.

Clause 31. The method of clause 30, wherein the physical fiducial reference and the virtual fiducial reference each have known dimensions and a plurality of features for identifying a distance from a camera to the fiducial reference and an orientation of the fiducial reference.

Clause 32. The method of clause 30 or clause 31, wherein the physical fiducial reference and the virtual fiducial reference each comprise a Charuco target.

Clause 33. The method of any of clauses 30 to 32, wherein:
the one or more fixed cameras comprise a plurality of fixed cameras;
receiving at least one fixed camera image comprises receiving a plurality of fixed camera images from the plurality of fixed cameras; and
determining the 3D pose of the physical fiducial reference comprises:
determining, for each fixed camera image, coarse 3D pose values of the physical fiducial reference based on the dimensions and pose of the physical fiducial reference in the fixed camera image; and
determining the 3D pose of the physical fiducial reference by averaging the coarse 3D pose values of the plurality of fixed camera images or performing an optimisation routine to reduce a total error between the 3D pose of the physical fiducial reference and the coarse 3D pose values of the plurality of fixed camera images.

Clause 34. The method of any of clauses 30 to 32, wherein:
the one or more fixed cameras comprise a plurality of fixed cameras;
receiving at least one fixed camera image comprises receiving a plurality of fixed camera images from the plurality of fixed cameras; and
determining the 3D pose of the physical fiducial reference comprises triangulating the 3D pose of the physical fiducial reference based on the pose of the fiducial reference in each fixed camera image.

Clause 35. The method of any of clauses 30 to 33 wherein the one or more roving images comprises a plurality of roving images captured with the mobile camera at a corresponding plurality of different poses, wherein determining the 3D geometrical relationship between the physical fiducial reference and the virtual fiducial reference comprises:
determining, for each roving image, a coarse 3D geometrical relationship value between the physical fiducial reference and the virtual fiducial reference based on the dimensions and pose of each of the physical fiducial reference and the virtual fiducial reference in the roving image; and
determining the 3D geometrical relationship between the physical fiducial reference and the virtual fiducial reference by averaging the 3D coarse geometrical relationship values of the plurality of roving images or performing an optimisation routine to reduce a total error between the 3D geometrical relationship between the physical fiducial reference and the virtual fiducial reference and the coarse 3D geometrical relationship values of the plurality of roving images.

Clause 36. The method of any of clauses 30 to 35, wherein each of the one or more fixed cameras comprise near infra-red, NIR, cameras and the mobile camera comprises a visible camera.

Clause 37. The method of any of clauses 30 to 36, wherein performing the eye gaze tracking operation comprises:
receiving images of the user viewing a gaze reference marker on the fixed screen from the plurality of fixed cameras.

Clause 38. The method of clause 37, further comprising:
determining a gaze of the user by determining a gaze origin of the user in the world coordinate system by processing the captured images with an eye-tracking algorithm and determining a gaze ray from the gaze origin to the reference marker in the world coordinate system; or
estimating an accuracy of an eye gaze tracking algorithm by comparing a calculated gaze ray, calculated by processing a captured image with the eye gaze tracking algorithm, with the position of the reference marker in the world coordinate system.

Clause 39. A system for generating training images for a machine learning head-pose detection algorithm, the system comprising:
a plurality of cameras each arranged at a different fixed pose in a world coordinate system to capture an image of a user's head;
a plurality of illuminators each arranged at a different pose in the world coordinate system to illuminate the user's head; and
a controller configured to:
for each of a plurality of different illuminator sets comprising at least one of the plurality of illuminators,
set each illuminator of the illuminator set to an on state and set the remaining illuminators of the plurality of illuminators to an off state; and
control the plurality of cameras to capture an image set comprising an image from each camera of the user's head;
determine a head pose of the user's head with respect to the world coordinate system based on the pose of a head module fiducial reference in each image of at least one image set, and the fixed pose of each camera in the world coordinate system; and
generate a plurality of training images by annotating each image in each image set with an image head pose value based on the head pose of the user with respect to the world coordinate system, and the pose of the respective camera in the world coordinate system.

Clause 40. The system of clause 39, wherein the controller is configured to:
  determine a pose of a head module coordinate system based on the 3D pose of the head module fiducial reference; and
  determine the head pose of the user's head by transforming the pose of the head module coordinate system using a predetermined mapping operator for mapping the head module coordinate system to a head coordinate system.

Clause 41. The system of clause 40, wherein the controller is configured to capture all image sets in a time period less than 500 milliseconds.

Clause 42. The system of clause 39 to 41, wherein each illuminator set consists of one illuminator.

Clause 43. The system of any of clauses 39 to 42, wherein the controller is configured to:
  combine two or more images from different image sets captured by the same camera to generate further training images.

Clause 44. The system of clause 43, wherein the controller is configured to:
  sum the two or more images using a plurality of different weightings for each image to generate the further training images.

Clause 45. The system of any of clauses 39 to 44, wherein the controller is configured to:
  determine a first head pose of the user's head with respect to the world coordinate system based on the pose of a head module fiducial reference in each image of a first image set, and the fixed pose of each camera in the world coordinate system;
  determine a second head pose of the user's head with respect to the world coordinate system based on the pose of a head module fiducial reference in each image of a second image set, and the fixed pose of each camera in the world coordinate system; and
  generate the training images if a difference between the first head pose and the second head pose variation is less than a movement threshold.

Clause 46. A method of generating training images for a machine learning head-pose detection algorithm, the method comprising:
  for each of a plurality of different illuminator sets comprising at least one of a plurality of illuminators, wherein each of the plurality of illuminators is arranged at a different pose in a camera coordinate system to illuminate a user's head,
    setting each illuminator of the illuminator set to an on state and setting the remaining illuminators of the plurality of illuminators to an off state; and
    controlling a plurality of cameras, each arranged at a different fixed pose in the world coordinate system, to capture an image set comprising an image from each camera of the user's head;
  determining a head pose of the user's head with respect to the world coordinate system based on the pose of a head module fiducial reference in each image of at least one image set and the pose of each fixed camera in the world coordinate system; and
  generating a plurality of training images by annotating each image in each image set with an image head pose value based on the head pose of the user with respect to the world coordinate system and the pose of the respective camera in the world coordinate system.

Clause 47. A method for assessing an accuracy of a trained machine learning head pose detection and eye gaze algorithm for a remote eye tracking system, the method comprising:
  receiving a first image captured by a mobile camera arranged in a first pose in an environment of the remote eye tracking system, wherein the first image includes a first plurality of fiducial references comprising a first subset of a total plurality of fiducial references, and wherein each fiducial reference of the total plurality of fiducial references has:
    known dimensions and a plurality of features for identifying a three-dimensional, 3D, pose of the fiducial reference in a mobile camera coordinate system, from a camera image; and
    a fixed pose in the environment of the remote eye tracking system;
  determining the 3D pose of each fiducial reference of the first subset in a first coordinate system, corresponding to the mobile camera coordinate system when the mobile camera is arranged in the first pose, based on the dimensions and a pose of the respective fiducial reference in the first image;
  receiving a second image captured by the mobile camera arranged in a second pose in the environment, wherein the second image includes a second plurality of fiducial references comprising a second subset of the total plurality of fiducial references and wherein the first subset and the second subset each comprise at least one common fiducial reference;
  determining the 3D pose of each fiducial reference of the second subset in a second coordinate system, corresponding to the mobile camera coordinate system when the mobile camera is arranged in the second pose, based on the dimensions and pose of the respective fiducial reference in the second image;
  determining the relative 3D pose of each fiducial reference of the first and second subsets, in an environment coordinate system, based on:
    the 3D pose of each fiducial reference of the first subset in the first coordinate system;
    the 3D pose of each fiducial reference of the second subset in the second coordinate system; and
    a difference between the 3D pose of the at least one common fiducial reference in the first coordinate system and the second coordinate system;
  receiving a third image captured by a camera arranged in a fixed user monitoring pose in the environment, wherein the third image includes a third plurality of fiducial references comprising a third subset of the total plurality of fiducial references and wherein the third subset comprises at least one further common fiducial reference of the first subset and/or the second subset;
  determining the 3D pose of each fiducial reference of the third subset in a monitoring coordinate system based on the dimensions and pose of the respective fiducial reference in the third image;
  determining the 3D pose of each fiducial reference of the first and second subset in the monitoring coordinate system based on:
    the relative 3D pose of each fiducial reference of the first and second subsets in the environment coordinate system; and
    the difference between the 3D pose of the at least one further common fiducial reference in the environment coordinate system and the monitoring coordinate system;

receiving further images captured by the camera in the fixed user monitoring pose, wherein each further image includes a user looking at a different test fiducial marker of the total plurality of fiducial references;

for each further image:
determining a gaze ray of the user in the monitoring coordinate system by processing the further image using the trained machine learning head pose detection and eye gaze algorithm; and
determining an error of the gaze ray based on a minimum distance from the gaze ray to the 3D position of the test fiducial marker; and estimating an accuracy of the trained machine learning head pose detection and eye gaze algorithm based on the error of the gaze ray of each further image.

Clause 48. The method of clause 47, wherein the fiducial references comprise Charuco markers and/or Aruco markers.

The invention claimed is:

1. A system for tracking a pose of a head of a user and generating training data, the system comprising a motion-capture head module for tracking a head pose of a user, the motion-capture head module comprising:
a flexible headband for attaching to a head of the user;
a post extending from the headband;
at least three markers, wherein each marker is coupled to the post by a respective one of at least three branching elements extending from the post, such that the at least three markers have a first fixed geometrical relationship with respect to each other; wherein the system further comprises:
at least one camera configured to capture images of the user wearing the motion-capture head module from a known pose in a world coordinate system;
a processing unit configured to:
triangulate three-dimensional (3D) coordinates of the markers based on images captured from at least two cameras at a given time;
determine a deformation of the flexible headband based on the triangulated 3D coordinates of one or more markers;
determine a 3D profile of the headband in a head module coordinate system based on the deformation of the headband;
determine a pose of the head module coordinate system with respect to the world coordinate system;
determine a two-dimensional (2D) profile of the headband in an image based on the pose of the head module coordinate system and the pose of the respective camera in the world coordinate system; and
generate a training image by painting over the 2D profile of the headband in the image.

2. The system of claim 1, wherein the post comprises a rigid post and the at least three branching members comprise rigid branching members.

3. The system of claim 1, wherein the at least three markers comprise at least three reflective markers.

4. The system of claim 1, wherein the first fixed geometrical relationship comprises an irregular relationship.

5. The system of claim 1, wherein each marker comprises a different size.

6. The system of claim 1, wherein the motion-capture head module further comprises:
a second post extending from the headband; and
at least three further markers, wherein each further marker is coupled to the second post by a respective one of at least three further branching members extending from the second post, such that the at least three further markers have a second fixed geometrical relationship with respect to each other.

7. The system of claim 6, wherein the second fixed geometrical relationship is different to the first fixed geometrical relationship.

8. A method for tracking a pose of a head of a user, the method comprising:
receiving a first image, captured by a first camera at a first time, of the user wearing a motion-capture head module, wherein the motion capture head module comprises:
a headband;
a first cluster of markers comprising a first marker, a second marker and a third marker having a first fixed geometrical relationship with respect to each other; and
a second cluster of markers comprising a fourth marker, a fifth marker and a sixth marker, having a second fixed geometrical relationship with respect to each other;
receiving a second image, captured by a second camera at the first time, of the user wearing the motion-capture head module, wherein the first camera and the second camera each have a different known pose in a world coordinate system and wherein the first to sixth markers are visible in both the first and second images;
triangulating three-dimensional (3D) coordinates of each marker in each of the first cluster and the second cluster in the world coordinate system, based on the position of each marker in each of the first image and the second image;
individually associating each triangulated 3D coordinate with a respective one of the first to sixth markers using the first and second fixed geometrical relationships;
determining a third fixed geometrical relationship between each of the first to sixth markers based on the specifically associated 3D coordinates of each marker;
receiving further first images captured by the first camera at a series of time points and receiving corresponding further second images captured by the second camera at the series of time points, wherein each further first image and each further second image capture the user wearing the motion-capture head module;
for each corresponding pair of further first and second images:
triangulating the 3D coordinates of at least three markers of the first to sixth markers in the world coordinate system based on the position of each of the at least three markers in the further first image and the further second image; and
determining a pose of a head module coordinate system with respect to the world coordinate system based on the 3D coordinates of the at least three markers and the third fixed geometrical relationship;
wherein the headband is a flexible headband, and the method further comprises:
determining a deformation of the headband based on the individually associated 3D coordinates of one or more markers in each of the first cluster and the second cluster;
determining a 3D profile of the headband in the head module coordinate system based on the deformation of the headband;
determining a two-dimensional, 2D, profile of the headband in each of the further first images and further second images based on:

a pose of the head module coordinate system with respect to the world coordinate system in the respective further first image or further second image;
a pose of the respective first or second camera in the world coordinate system; and
generating first and second training images by painting over the 2D profile of the headband in each of the respective further first images and further second images.

9. The method of claim 8, wherein the second fixed geometrical relationship is different to the first fixed geometrical relationship.

10. The method of claim 8, wherein each marker comprises a different size.

11. The method of claim 8, wherein the first fixed geometrical relationship and the second fixed geometrical relationship comprise an irregular relationship.

12. A method of generating training images for a machine learning head-pose detection algorithm, the method comprising:
performing the method of tracking a pose of a head of a user according to claim 9;
determining a head pose value for each further first image and further second image based on the respective pose of the head module coordinate system and the pose of the first camera and the second camera in the world coordinate system;
determining a deformation of the flexible headband based on the individually associated 3D coordinates of one or more markers in each of the first cluster and the second cluster;
determining a 3D profile of the headband in the head module coordinate system based on the deformation of the headband;
determining a two-dimensional, 2D, profile of the headband in each of the further first images and further second images based on:
a pose of the head module coordinate system with respect to the world coordinate system in the respective further first image or further second image;
a pose of the respective first or second camera in the world coordinate system; and
generating first and second training images by painting over the 2D profile of the headband in each of the respective further first images and further second images and annotating them with the respective head pose value.

13. The method of claim 12, wherein determining the head pose value for each further first image and further second image based on the respective pose of the head module coordinate system comprises determining a pose of a head coordinate system with respect to the world coordinate system by transforming the head module coordinate system using a predetermined mapping operator.

* * * * *